(12) United States Patent
Kim et al.

(10) Patent No.: US 11,706,438 B2
(45) Date of Patent: *Jul. 18, 2023

(54) METHOD AND DEVICE FOR ENCODING AND DECODING IMAGE

(71) Applicant: Electronics and Telecommunications Research Institute, Daejeon (KR)

(72) Inventors: Hui Yong Kim, Daejeon (KR); Jin Ho Lee, Daejeon (KR); Sung Chang Lim, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,709

(22) Filed: Dec. 7, 2021

(65) Prior Publication Data

US 2022/0094963 A1 Mar. 24, 2022

Related U.S. Application Data

(63) Continuation of application No. 17/028,678, filed on Sep. 22, 2020, now Pat. No. 11,228,778, which is a
(Continued)

(30) Foreign Application Priority Data

Jan. 18, 2012 (KR) ........................ 10-2012-0005950
Jan. 18, 2013 (KR) ........................ 10-2013-0005653

(51) Int. Cl.
*H04N 11/02* (2006.01)
*H04N 19/51* (2014.01)
(Continued)

(52) U.S. Cl.
CPC ........... *H04N 19/51* (2014.11); *H04N 19/105* (2014.11); *H04N 19/182* (2014.11);
(Continued)

(58) Field of Classification Search
CPC .... H04N 19/51; H04N 19/105; H04N 19/182; H04N 19/196; H04N 19/42;
(Continued)

(56) References Cited

U.S. PATENT DOCUMENTS 7,492,952 B2 2/2009 Abe et al.
9,807,412 B2 10/2017 Kim et al.
(Continued)

FOREIGN PATENT DOCUMENTS

AU 2008201158 A1 4/2008
CN 1751518 A 3/2006
(Continued)

OTHER PUBLICATIONS

Bross et al., "WD4: Working Draft 4 Of High Efficiency Video Coding", Joint Collaborative Team On Video Coding (JCT-VC) Of ITU-T SG16 WP3 And ISO/IEC JTC1/SC29/WG11, 6th Meeting: Torino, IT, Jul. 14-22, 2011.
(Continued)

*Primary Examiner* — Howard D Brown, Jr.
(74) *Attorney, Agent, or Firm* — Shield Intellectual Property PC; Zhichong Gu

(57) ABSTRACT

An image decoding method according to the present invention includes reconstructing a residual block by inverse-quantizing and inverse-transforming an entropy-decoded residual block, generating a prediction block by performing intra prediction on a current block, and reconstructing an picture by adding the reconstructed residual block to the prediction block, wherein generating the prediction block includes generating a final prediction value of a prediction
(Continued)

target pixel included in the current block based on a first prediction value of the prediction target pixel and a final correction value calculated by performing an arithmetic right shift on a two's complementary integer representation for an initial correction value of the prediction target pixel by a binary digit of 1. Accordingly, upon image encoding/decoding, computation complexity may be reduced.

12 Claims, 16 Drawing Sheets

Related U.S. Application Data continuation of application No. 16/430,348, filed on Jun. 3, 2019, now Pat. No. 10,834,418, which is a continuation of application No. 15/717,379, filed on Sep. 27, 2017, now Pat. No. 10,397,598, which is a continuation of application No. 14/372,278, filed as application No. PCT/KR2013/000417 on Jan. 18, 2013, now Pat. No. 9,807,412.

(51) Int. Cl.

| | |
|---|---|
| H04N 19/196 | (2014.01) |
| H04N 19/82 | (2014.01) |
| H04N 19/513 | (2014.01) |
| H04N 19/593 | (2014.01) |
| H04N 19/105 | (2014.01) |
| H04N 19/182 | (2014.01) |
| H04N 19/42 | (2014.01) |
| H04N 19/52 | (2014.01) |

(52) U.S. Cl.
CPC ........... *H04N 19/196* (2014.11); *H04N 19/42* (2014.11); *H04N 19/513* (2014.11); *H04N 19/52* (2014.11); *H04N 19/593* (2014.11); *H04N 19/82* (2014.11)

(58) Field of Classification Search
CPC .... H04N 19/513; H04N 19/52; H04N 19/593; H04N 19/82; H04N 19/117; H04N 19/86; H04N 19/59; H04N 19/124; H04N 19/13; H04N 19/176
See application file for complete search history.

(56) References Cited

U.S. PATENT DOCUMENTS

| | | | | |
|---|---|---|---|---|
| 9,967,572 | B2* | 5/2018 | Min | H04N 19/159 |
| 11,228,778 | B2* | 1/2022 | Kim | H04N 19/513 |
| 2008/0165860 | A1 | 7/2008 | Sahraoui et al. | |
| 2009/0010330 | A1 | 1/2009 | Tourapis et al. | |
| 2011/0054334 | A1 | 3/2011 | Fischell et al. | |
| 2011/0090969 | A1 | 4/2011 | Sung et al. | |
| 2011/0310969 | A1* | 12/2011 | Park | H04N 19/86 |
| | | | | 375/E7.246 |
| 2014/0064368 | A1 | 3/2014 | Minezawa et al. | |
| 2014/0334551 | A1* | 11/2014 | Kim | H04N 19/82 |
| | | | | 375/240.16 |
| 2015/0098511 | A1 | 4/2015 | Park et al. | |
| 2015/0229965 | A1* | 8/2015 | Park | H04N 19/593 |
| | | | | 375/240.12 |
| 2017/0374370 | A1* | 12/2017 | Min | H04N 19/159 |
| 2018/0020230 | A1 | 1/2018 | Kim et al. | |
| 2019/0289312 | A1 | 9/2019 | Kim et al. | |
| 2021/0006816 | A1 | 1/2021 | Kim et al. | |

FOREIGN PATENT DOCUMENTS

| | | |
|---|---|---|
| CN | 1810041 A | 7/2006 |
| CN | 1866750 A | 11/2006 |
| CN | 101194515 A | 6/2008 |
| CN | 101379830 A | 3/2009 |
| CN | 101433094 A | 5/2009 |
| CN | 101496407 A | 7/2009 |
| CN | 101653006 A | 2/2010 |
| CN | 101867814 A | 10/2010 |
| CN | 101883286 A | 11/2010 |
| EP | 0244660 A2 | 11/1987 |
| JP | 2007312072 A | 11/2007 |
| JP | 2010283739 A | 12/2010 |
| JP | 2014518031 A | 7/2014 |
| KR | 20070115551 A | 12/2007 |
| KR | 20080064355 A | 7/2008 |
| KR | 20090043353 A | 5/2009 |
| KR | 20100092268 A | 8/2010 |
| KR | 20110062516 A | 6/2011 |
| KR | 20110113583 A | 10/2011 |
| KR | 20110138098 A | 12/2011 |
| KR | 20120005934 A | 1/2012 |
| KR | 20120008299 U | 12/2012 |
| WO | 2007029914 A1 | 3/2007 |
| WO | 2007081116 A1 | 7/2007 |
| WO | 2007139266 A1 | 12/2007 |
| WO | 2010093146 A2 | 8/2010 |
| WO | 2011070730 A1 | 6/2011 |
| WO | 2011126345 A2 | 10/2011 |
| WO | 2011139099 A2 | 11/2011 |
| WO | 2012005549 A3 | 4/2012 |
| WO | 2012090501 A1 | 7/2012 |
| WO | 2012122783 A1 | 9/2012 |
| WO | 2012176381 A1 | 12/2012 |

OTHER PUBLICATIONS

Bross et al., "WD5: Working Draft 5 Of High-Efficiency Video Coding", Joint Collaborative Team On Video Coding (JCT-VC) Of ITU-T SG16 WP3 And ISO/IEC JTC1/SC29/WG11, 7th Meeting: Geneva, CH, Nov. 21-30, 2011.

Chuang et al., "Non-CE9: Division-Free MV Scaling", Joint Collaborative Team On Video Coding (JCT-VC) Of ITU-T SG16 WP3 And ISO/IEC JTC1/SC29/WG11, 7th Meeting: Geneva, CH, Nov. 21-30, 2011.

European Patent Office, Application No. 14181064.8, Extended Search Report dated Oct. 29, 2014.

Japanese Patent Office, Application No. 2014-243486, Office Action dated Jan. 6, 2015.

Japanese Patent Office, Application No. 2019-039837, Office Action dated Jan. 24, 2020.

Japanese Patent Office, Application No. 2019-039837, Office Action dated Apr. 6, 2021.

Kazui et al., "Cross-Verification Result Of JCTVC-F172 Proposed By Mitsubishi" (Jul. 14-22, 2011), Joint Collaborative Team On Video Coding (JCT-VC) Of ITU-T SG16 WP3 And ISO/IEC JTC1/SC29/WG11, 6th Meeting: Torino, Jul. 14-22, 2011.

Kim et al., "Reduction Of Reference Picture List Checking For Temporal Motion Vector Prediction", Joint Collaborative Team On Video Coding (JCT-VC) Of ITU-T SG16 WP3 And ISO/IEC JTC1/SC29/WG11, 6th Meeting: Torino, Jul. 14-22, 2011.

Kim et al., "Restriction On Motion Vector Scaling For Merge And AMVP," Joint Collaborative Team On Video Coding (JCT-VC) Of ITU-T SG16 WP3 And ISO/IEC JTC1/SC29/WG11, 7th Meeting: Geneva, CH, Nov. 21-30, 2011.

Korean Patent Office, Application No. 10-2013-0093274, Notice of Allowance dated Oct. 20, 2014.

Korean Patent Office, Application No. 10-2013-0093305, Notice of Allowance dated May 22, 2014.

Lim et al., "Non-CE6: Simplification Of Intra Vertical/Horizontal Prediction", Joint Collaborative Team On Video Coding (JCT-VC) Of ITU-T SG16 WP3 And ISO/IEC JTC1/SC29/WG11, 8th Meeting: San Jose, CA, USA, Feb. 1-10, 2012.

Lin et al., "Improved Advanced Motion Vector Prediction" (Jan. 20-28, 2011), Joint Collaborative Team On Video Coding (JCT-VC) Of ITU-T SG16 WP3 And ISO/IEC JTC1/SC29/WG11, 4th Meeting.

(56) References Cited

OTHER PUBLICATIONS

Minezawa et al., "An Improved Intra Vertifcal And Horizontal Prediction" (Jul. 14-22, 2011), Joint Collaborative Team On Video Coding (JCT-VC) Of ITU-T SG16 WP3 And ISO/IEC JTC1/SC29/WG11, 6th Meeting.
Park et al., "Modification Of Temporal MV Memory Compression And Temporal MV Predictor" (Mar. 16-23, 2011), Joint Collaborative Team On Video Coding (JCT-VC) Of ITU-T SG16 WP3 And ISO/IEC JTC1/SC29/WG11, 5th Meeting.
Sugio et al., "Non-CE9: Simplified Scaling Calculation Method For Temporal Spatial MVP Of AMVP/Merge", Joint Collaborative Team On Video Coding (JCT-VC) Of ITU-T SG16 WP3 And ISO/IEC JTC1/SC29/WG11, 7th Meeting: Geneva, CH, Nov. 21-30, 2011.
Tourapis et al., "Direct Mode Coding For Bipredictive Slices In The H.264 Standard", IEEE Transactions On Circuits And Systems For Video Technology, vol. 15, No. 1, Jan. 2005.
U.S. Appl. No. 15/717,379, Advisory Action dated Aug. 13, 2018.
U.S. Appl. No. 15/717,379, Final Office Action dated Jun 15, 2018.
U.S. Appl. No. 15/717,379, Final Office Action dated Mar. 22, 2019.
U.S. Appl. No. 15/717,379, Non-Final Office Action dated Nov. 20, 2017.
U.S. Appl. No. 15/717,379, Non-Final Office Action dated Sep. 14, 2018.
U.S. Appl. No. 15/717,379, Notice of Allowance dated Apr. 10, 2019.
U.S. Appl. No. 16/430,348, Advisory Action dated Jun. 18, 2020.
U.S. Appl. No. 16/430,348, Final Office Action dated Apr. 30, 2020.
U.S. Appl. No. 16/430,348, Non-Final Office Action dated Oct. 31, 2019.
U.S. Appl. No. 16/430,348, Notice of Allowance dated Jul. 14, 2020.
U.S. Appl. No. 17/028,678, Notice of Allowance dated Sep. 20, 2021.
Wiegand et al., "WD3: Working Draft 3 Of High-Efficiency Video Coding" (Mar. 16-23, 2011), Joint Collaborative Team On Video Coding (JCT-VC) Of ITU-T SG16 WP3 And ISO/IEC JTC1/SC29/WG11, 5th Meeting.
Wikipedia et al., "Arithmetic Shift", Dec. 21, 2011 (Dec. 21, 2011), XP055223524, Retrieved From The Internet: URL: https://en.wikipedia.org/w/index/php?title=Arithmetic_shift&oldid=467-000593, Retrieved On Oct. 26, 2015 (5 Pages).
World Intellectual Property Organization, Application No. PCT/KR2013/000417, International Search Report dated Apr. 19, 2013.
Japanese Patent Office, Application No. 2021-022496, Office Action dated Sep. 27, 2022.
Bross et al., "High Efficiency Video Coding (HEVC) Text Specification Draft 10 (For FDIS & Consent)", Joint Collaborative Team On Video Encoding (JCT-VC) Of ITU-T SG 16 WP 3 And ISO/IEC JTC 1/SC 29/WG 11, 12th Meeting: Geneva, CH, Jan. 14-23, 2013.
Japanese Patent Office, Application No. 2019-039837, Office Action dated Jun. 28, 2022.
Chinese Patent Office, Application No. 201911107028.4, Notice of Allowance dated Nov. 7, 2022.
Chinese Patent Office, Application No. 201911107047.7, Notice of Allowance dated Nov. 14, 2022.
Chinese Patent Office, Application No. 201911106288.X, Office Action dated Feb. 18, 2023.
Chinese Patent Office, Application No. 201911106293.0, Office Action dated Feb. 16, 2023.
Chinese Patent Office, Application No. 201911106301.1, Office Action dated Feb. 15, 2023.
Chinese Patent Office, Application No. 2019111070496, Office Action dated Feb. 17, 2023.
Anonymous, "Two's Complement—Wikipedia", Sep. 23, 2008 (Sep. 23, 2008), XP055388733, Retrieved From The Internet: URL: https://en.wikipedia.org/w/index/php?title=Two's_complement&oldid=240458659, Retrieved On Jul. 6, 2017
Chinese Patent Office, Application No. 201911107027.X, Office Action dated Mar. 25, 2023.
European Patent Office, Application No. 19151111.2, Office Action dated Apr. 4, 2023.
Wiegand et al., "Study Of Final Committee Draft Of Joint Video Specification", Joint Video Team (JVT) Of ISO/IEC MPEG & ITU-T VCEG (ISO/IEC JTC1/SC29/WG11 And ITU-T SG16 Q.6), 6th Meeting: Awaji, Island, JP, Dec. 5-13, 2022.
Zhang et al., "Non-CE9: Improvement In Temporal Candidate Of Merge Mode And AMVP", Joint Collaborative Team On Video Encoding (JCT-VC) Of ITU-T SG 16 WP 3 And ISO/IEC JTC1/SC29/WG11, 7th Meeting: Geneva, CH, Nov. 21-30, 2011.

* cited by examiner

METHOD AND DEVICE FOR ENCODING AND DECODING IMAGE

CROSS-REFERENCE TO RELATED APPLICATIONS

This application is a continuation of application Ser. No. 17/028,678, filed on Sep. 22, 2020, which is a continuation of application Ser. No. 16/430,348, filed on Jun. 3, 2019, which is a continuation of application Ser. No. 15/717,379 (now U.S. Pat. No. 10,397,598), filed on Sep. 27, 2017, which is a continuation of application Ser. No. 14/372,278 (now U.S. Pat. No. 9,807,412), filed on Jul. 15, 2014, which is a national stage application of International Application No. PCT/KR2013/000417 filed on Jan. 18, 2013, which claims the benefit of Korean Application No. 10-2012-0005950 filed on Jan. 18, 2012, and Korean Application No. 10-2013-0005653 filed on Jan. 18, 2013, in the Korean Intellectual Property Office, the entire disclosures of which are incorporated herein by reference for all purposes. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention concerns a method and apparatus for encoding and decoding an images, and more specifically, to an intra prediction and inter prediction method by reducing computation complexity.

BACKGROUND

Recent spread of HD (High Definition) broadcast services nationwide and worldwide makes more users familiar with high-resolution, high-quality images, and many organizations put more efforts to development of next-generation imaging devices. Further, more interest is oriented towards UHD (Ultra High Definition) having 4 times or more resolution than HDTV, as well as HDTV, so that image compression technologies for higher-resolution, higher-quality images are demanded.

For purposes of image compression, an inter prediction for predicting a pixel value included in a current picture from a temporally previous and/or subsequent picture, an intra prediction for predicting a pixel value included in a current picture by using pixel information in the current picture, and an entropy encoding for assigning a shorter code to a more frequent symbol while assigning a longer code to a less frequent symbol may be used.

BRIEF SUMMARY OF INVENTION

Technical Problem

Figure 1:
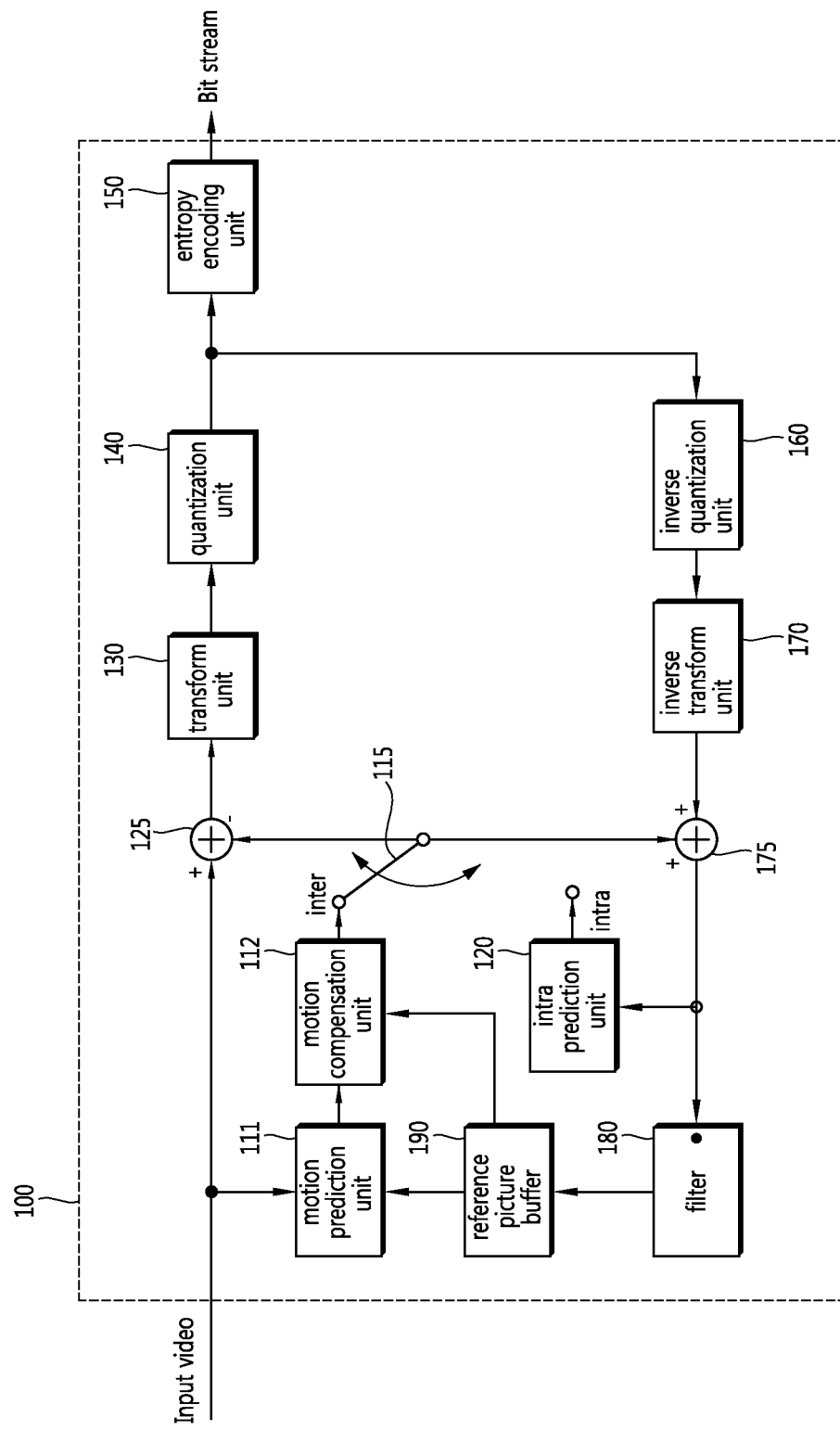
FIG. 1 is a block diagram illustrating a configuration of an image encoding apparatus according to an embodiment of the present invention.

An object of the present invention is to provide an image encoding method and apparatus that may enhance image encoding/decoding efficiency by reducing computation complexity.

Another object of the present invention is to provide an image decoding method and apparatus that may enhance image encoding/decoding efficiency by reducing computation complexity.

Still another object of the present invention is to provide a prediction block generating method and apparatus that may enhance image encoding/decoding efficiency by reducing computation complexity.

Yet still another object of the present invention is to provide an intra prediction method and apparatus that may enhance image encoding/decoding efficiency by reducing computation complexity.

Yet still another object of the present invention is to provide an inter prediction method and apparatus that may enhance image encoding/decoding efficiency by reducing computation complexity.

Technical Solution

To achieve the above objects, an image decoding method according to the present invention includes the steps of reconstructing a residual block by inverse-quantizing and inverse-transforming an entropy-decoded residual block, generating a prediction block by performing intra prediction on a current block, and reconstructing an picture by adding the reconstructed residual block to the prediction block, the step of generating the prediction block includes the step of generating a final prediction value of a prediction target pixel included in the current block based on a first prediction value of the prediction target pixel and a final correction value calculated by performing an arithmetic right shift on a two's complementary integer representation for an initial correction value of the prediction target pixel by a binary digit of 1.

The step of generating the prediction block may include the steps of determining whether to correct an intra prediction value depending on encoding information of the current block and a position of the prediction target pixel in the current block and generating a final prediction value of the prediction target pixel based on a result of the determination.

The step of determining whether to correct may include the step of determining whether to correct the intra prediction value considering at least one of an intra prediction mode of the current block, luma signal information, chroma signal information, and a block size.

The step of determining whether to correct may include the step of determining that, in a case where an intra prediction mode of the current block is a vertical direction prediction mode, correction may be performed on a pixel positioned at a left boundary in the current block.

The step of determining whether to correct may include the step of determining that, in a case where an intra prediction mode of the current block is a horizontal direction prediction mode, correction may be performed on a pixel positioned at an upper boundary in the current block.

The step of generating the final prediction value may include, in a case where correction is determined to be performed on an intra prediction value, the steps of obtaining a first prediction value using a value of a reference pixel adjacent to the current block, determining an initial correction value depending on a horizontal or vertical position of the prediction target pixel in the block, calculating a final correction value by performing an arithmetic right shift on the two's complementary integer representation for the initial correction value by a binary digit of 1, and calculating the final prediction value based on the first prediction value and the final correction value.

In a case where the intra prediction mode is a vertical direction prediction mode, correction may be performed on a pixel positioned at a left boundary of the current block, the first prediction value may be generated using a value of an upper reference pixel adjacent to the current block, the initial correction value may be determined using a difference between a value of a left reference pixel corresponding to a vertical position of the prediction target pixel in the block and a value of a left and upper cornered reference pixel adjacent to the current block, and in a case where the intra prediction mode is a horizontal direction prediction mode, correction may be performed on a pixel positioned at an upper boundary of the current block, the first prediction value may be generated using a value of a left reference pixel adjacent to the current block, the initial correction value may be determined using a difference between a value of an upper reference pixel corresponding to a horizontal position of the prediction target pixel in the block and a value of a left and upper cornered pixel of the current block.

The step of generating the final prediction value may include, in a case were no correction is determined to be performed on the intra prediction value, the steps of generating a final prediction value of the prediction target pixel based on a value of an upper reference pixel adjacent to the current block in a vertical direction prediction mode, and generating a final prediction value of the prediction target pixel based on an value of an upper reference pixel adjacent to the current block in a horizontal direction prediction mode.

The image decoding method further may include the step of determining a reference pixel to be used for performing intra prediction on the prediction target pixel, the step of determining the reference pixel may include the steps of determining a reference pixel using an already reconstructed pixel among pixels adjacent to the current block and performing smoothing filtering on a pixel value of the reference pixel.

To achieve the above-described objects, an image decoding apparatus according to the present invention may include a residual block reconstructing unit that reconstructs a residual block by inverse-quantizing and inverse-transforming an entropy-decoded residual block, a prediction block generating unit that generates a prediction block by performing intra prediction on a current block, and an picture reconstructing unit that reconstructs an picture by adding the residual block to the prediction block, the prediction block generating unit generates a final prediction value of a prediction target pixel included in the current block based on a first prediction value of the prediction target pixel and a final correction value calculated by performing an arithmetic right shift on a two's complementary integer representation for an initial correction value of the prediction target pixel by a binary digit of 1.

To achieve the above-described objects, an image encoding method according to the present invention may include the steps of generating a prediction block by performing intra prediction on an input image and performing entropy encoding by transforming and quantizing a residual block that is a difference between a prediction block predicted by intra prediction and a current prediction block, the step of generating the prediction block may include the step of generating a final prediction value of a prediction target pixel included in the current block based on a first prediction value of the prediction target pixel and a final correction value calculated by performing an arithmetic right shift on a two's complementary integer representation for an initial correction value of the prediction target pixel by a binary digit of 1.

To achieve the above-described objects, an image encoding apparatus according to the present invention may include a prediction block generating unit that generates a prediction block by performing intra prediction on an input image and an encoding unit that performs entropy encoding by transforming and quantizing a residual block that is a difference between a prediction block predicted by intra prediction and a current prediction block, the step of generating the prediction block may include the step of generating a final prediction value of a prediction target pixel included in the current block based on a first prediction value of the prediction target pixel and a final correction value calculated by performing an arithmetic right shift on a two's complementary integer representation for an initial correction value of the prediction target pixel by a binary digit of 1.

To achieve the above-described objects, an image decoding method according to the present invention may include the steps of reconstructing a residual block by inverse-quantizing and inverse-transforming an entropy-decoded residual block, generating a prediction block by performing intra prediction on a current block, and reconstructing an picture by adding the reconstructed residual block to the prediction block, the step of generating the prediction block may include the steps of determining whether a reference picture of the current block is the same as a reference picture of the reference block and in a case where it is determined that the reference picture of the current block is not the same as the reference picture of the reference block, scaling a motion vector of the reference block and using the scaled motion vector for prediction of the current block.

Upon inducing a spatial or temporal motion vector and upon inducing a temporal merge candidate, the used reference block may include i) upon inducing the spatial motion vector, at least one of a lowermost block adjacent to a left side of the current block, a block adjacent to a lower side of the left and lowermost block, a left and upper cornered block of the current block, a right and upper cornered block of the current block, and an upper and rightmost block adjacent to the current block, and ii) upon inducing the temporal motion vector and iii) upon inducing the temporal merge candidate, at least one of blocks positioned in and outside a co-located block spatially corresponding to the current block in a co-located picture of a current picture.

The step of generating the prediction block may include the steps of obtaining first and second values based on a POC (Picture Order Count) difference between the pictures, calculating an inverse-proportional value of the first value by calculating an offset value by performing an arithmetic right shift on a two's complementary integer representation for an absolute value of the first value by a binary digit of 1, and calculating the scaling factor based on the inverse-proportional value of the first value and the second value.

i) upon inducing the spatial motion vector, the first value may be a difference between a POC of a current picture and a POC of a reference picture referred to by the reference block, and the second value may be a difference between a POC of the current picture and a POC of a reference picture referred to by the current block, and ii) upon inducing the temporal motion vector or iii) upon inducing the temporal merge candidate, the first value may be a difference between a POC of a co-located picture and a POC of a reference picture referred to by a co-located block and the current block in the co-located picture, and the second value may be a difference between a POC of a current block picture and a POC of a reference picture referred to by the current block.

The step of calculating the scaling factor may include the steps of calculating the scaling factor by performing an addition operation and an arithmetic right shift operation based on multiplication of the inverse-proportional value of the first value and the second value and adjusting the scaling factor to be included in a specific range.

To achieve the above-described objects, an image decoding apparatus according to the present invention may include a residual block reconstructing unit that reconstructs a residual block by inverse-quantizing and inverse-transforming an entropy-decoded residual block, a prediction block generating unit that generates a prediction block by performing intra prediction on a current block, and an picture reconstructing unit that reconstructs an picture by adding the reconstructed residual block to the prediction block, the prediction block generating unit may include a sameness determining unit that determines whether a reference picture of the current block is the same as a reference picture of the reference block and a scaling unit that, in a case where the reference of the current block is not the same as the reference picture of the reference block, scales a motion vector of the reference block and uses the scaled motion vector for prediction of the current block.

To achieve the above-described objects, an image encoding method according to the present invention may include the steps of generating a prediction block by performing intra prediction on an input image and performing entropy encoding by transforming and quantizing a residual block that is a difference between the current input block and a prediction block predicted by intra prediction, the step of generating the prediction block may include the steps of determining whether a reference picture of the current block is the same as a reference picture of the reference block and in a case where the reference of the current block is not the same as the reference picture of the reference block, scaling a motion vector of the reference block and using the scaled motion vector for prediction of the current block.

To achieve the above-described objects, an image encoding apparatus according to the present invention may include a prediction block generating unit that generates a prediction block by performing intra prediction on an input image and an encoding unit that performs entropy encoding by transforming and quantizing a residual block that is a difference between the current input block and a prediction block predicted by intra prediction, the prediction block generating unit may include a sameness determining unit that determines whether a reference picture of the current block is the same as a reference picture of the reference block and a scaling unit that, in a case where the reference of the current block is not the same as the reference picture of the reference block, scales a motion vector of the reference block and uses the scaled motion vector for prediction of the current block.

Advantageous Effects

The image encoding method according to the present invention may reduce computation complexity and enhance image encoding/decoding efficiency.

The image decoding method according to the present invention may reduce computation complexity and enhance image encoding/decoding efficiency.

The prediction block generating method according to the present invention may reduce computation complexity and enhance image encoding/decoding efficiency.

The intra prediction method according to the present invention may reduce computation complexity and enhance image encoding/decoding efficiency.

The inter prediction method according to the present invention may reduce computation complexity and enhance image encoding/decoding efficiency.

DETAILED DESCRIPTION

Hereinafter, embodiments of the present invention will be described in detail with reference to the accompanying drawings. In describing the embodiments, when determined to make the gist of the invention unclear, the detailed description on the well-known configurations or functions will be omitted.

When a component is "connected to" or "coupled to" another component, the component may be directly connected or coupled to the other component, or other components may also intervene. Further, when a specific component is "included", other components are not excluded but may be included, and such configuration is also included in the scope of the invention.

The terms "first" and "second" may be used to describe various components, but the components are not limited thereto. These terms are used only to distinguish one component from another. For example, the first component may be also named the second component, and the second component may be similarly named the first component.

The constitutional parts in the embodiments are independently shown to represent different features, but this does not mean that each constitutional part is formed of a separate hardware unit or one software constitutional unit. That is, each constitutional part is separated from the others for ease of description. At least two of the constitutional parts may be combined into a single constitutional part, or one constitutional part may be divided into a plurality of constitutional parts which may perform functions, respectively. The embodiments covering the combinations of the constitutional parts or the separation thereof may be included in the scope of the invention without departing from the gist of the invention.

Some constitutional parts are not essential ones to perform the inevitable functions of the present invention but rather may be optional constitutional parts to enhance performance. The present invention may be implemented only by the constitutional parts necessary for realizing the gist of the invention or such a configuration that includes only the essential constitutional parts excluding the optional constitutional parts used for enhancing performance may also be included in the scope of the present invention.

FIG. 1 is a block diagram illustrating a configuration of an image encoding apparatus according to an embodiment of the present invention.

Referring to FIG. 1, the multi-view video image decoding apparatus 100 includes a motion prediction unit 111, a motion compensation unit 112, an intra prediction unit 120, a switch 115, a subtractor 125, a transform unit 130, a quantization unit 140, an entropy encoding unit 150, an inverse quantization unit 160, an inverse transform unit 170, an adder 175, a filter unit 180, and a reference image buffer 190. Here, the term "image" may be used to have the same meaning as the term "picture" to be described below.

The image encoding apparatus 100 may perform encoding on an input image in an intra mode or inter mode and may output a bit stream. The intra prediction means intra-screen prediction, and the inter prediction means inter-screen prediction. In the intra mode, the switch 115 may shift to intra, and in the inter mode, the switch 115 may shift to inter. The image encoding apparatus 100 may generate a prediction block on an input block of the input image and may then encoding a differential between the input block and the prediction block.

In the intra mode, the intra prediction unit 120 may generate a prediction block by performing spatial prediction using a pixel value of an already encoded block adjacent to a current block.

In the inter mode, the motion prediction unit 111 may obtain a motion vector by figuring out an area that best matches an input block of a reference image stored in the reference image buffer 190 during the course of motion prediction. The motion compensation unit 112 may generate a prediction block by performing motion compensation using a motion vector. Here, the motion vector is a 2D (two-dimensional) vector used for inter prediction, and may represent an offset between a current encoding/decoding target image and a reference image.

The subtractor 125 may generate a residual block based on a differential between an input block and a generated prediction block. The transform unit 130 may perform transform on a residual block to output a transform coefficient. The quantization unit 140 may perform quantization on an input transform coefficient based on a quantization parameter to output a quantized coefficient.

The entropy encoding unit 150 may perform entropy encoding based on a encoding parameter value produced during the course of encoding or values produced by the quantization unit 140 to thereby output a bit stream.

When entropy encoding applies, a fewer number of bits are assigned to a symbol having a higher probability of occurrence, while a more number of bits are assigned to a symbol having a lower probability of occurrence, so that the size of the bit stream for the encoding target symbols may be reduced. Accordingly, the compression performance of image encoding may be increased through entropy encoding. The entropy encoding unit 150 may adopt encoding schemes, such as exponential golomb, CAVLC (Context-Adaptive Variable Length Coding), CABAC (Context-Adaptive Binary Arithmetic Coding), for purposes of entropy encoding.

Since the image encoding apparatus shown in FIG. 1 conducts inter prediction encoding, i.e., inter-frame prediction encoding, a currently encoded image needs to be decoded and then stored to be used as a reference image. Accordingly, a quantized coefficient is inverse-quantized in the inverse quantization unit 160, and inverse-transformed in the inverse transform unit 170. An inverse-quantized, inverse-transformed coefficient is added to a prediction block through the adder 175, thereby producing a reconstructed block.

The reconstructed block passes through the filter unit 180 that may apply at least one or more of a deblocking filter, SAO (Sample Adaptive Offset), and ALF (Adaptive Loop Filter) to a reconstructed block or reconstructed picture. The filter unit 180 may be also called an adaptive in-loop filter. The deblocking filter may remove a distortion that occurs at a boundary between blocks. The SAO may add a proper offset value to a pixel value so as to compensate for a coding error. The ALF may perform filtering based on a value obtained by comparing a reconstructed image with an original image. A reconstructed block which has passed through the filter unit 180 may be stored in the reference image buffer 190.

Figure 2:
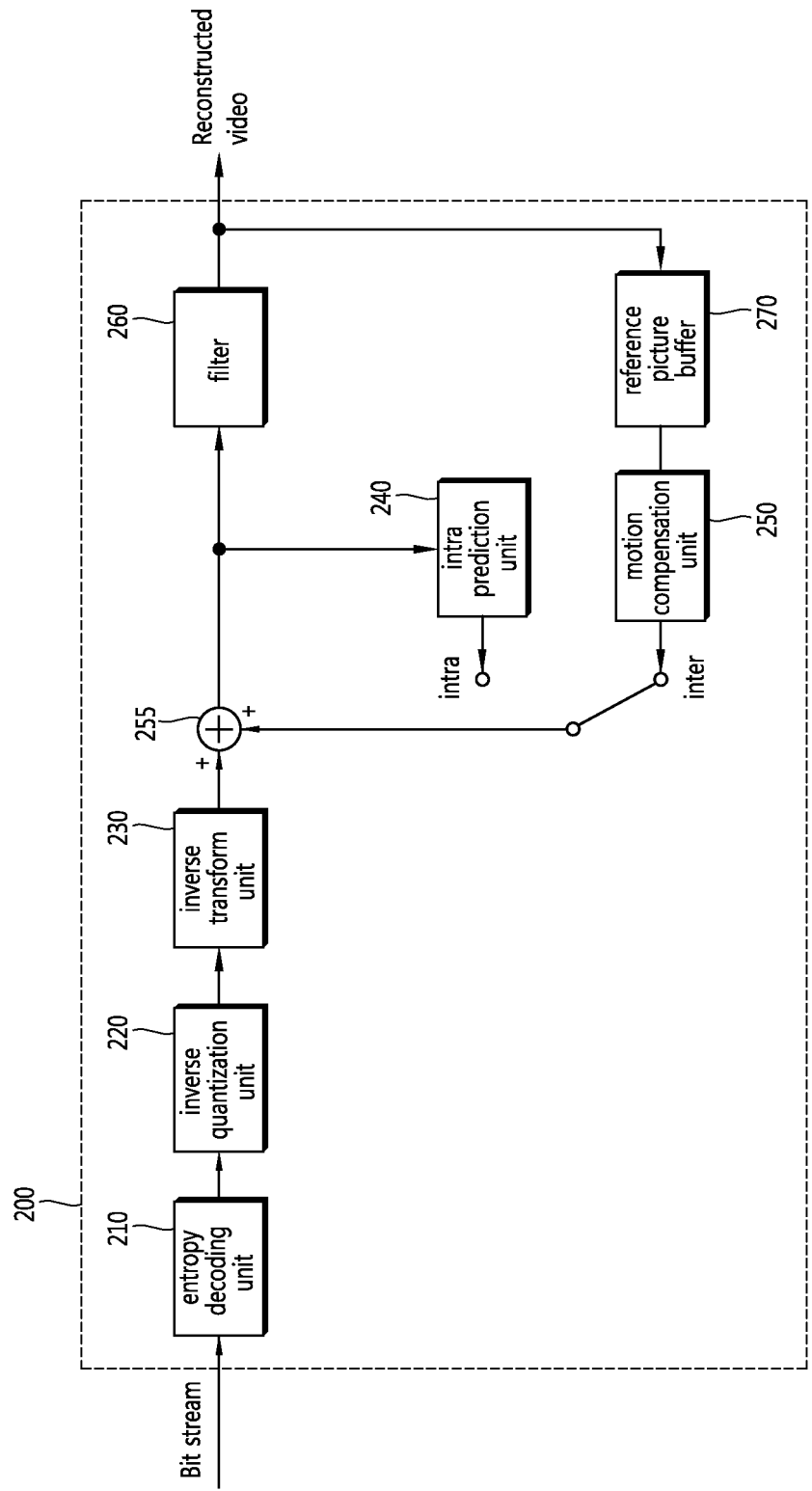
FIG. 2 is a block diagram illustrating a configuration of an image decoding apparatus according to an embodiment of the present invention.

FIG. 2 is a block diagram illustrating a configuration of an image decoding apparatus according to an embodiment of the present invention.

Referring to FIG. 2, the image decoding apparatus 200 includes an entropy decoding unit 210, an inverse-quantization unit 220, an inverse-transform unit 230, an intra prediction unit 240, a motion compensation unit 250, an adder 255, a filter unit 260, and a reference picture buffer 270.

The image decoding apparatus 200 may receive a bit stream output from an encoder, perform decoding in an intra mode or inter mode, and output a reconstructed image, i.e., a reconstructed image. In the intra mode, the switch may shift to intra, and in the inter mode, the switch may shift to inter. The image decoding apparatus 200 may obtain a reconstructed residual block from a received bit stream, generate a prediction block, and add the reconstructed residual block to the prediction block to thereby generate a reconstructed block, i.e., a reconstructed block.

The entropy decoding unit 210 may entropy-decode an input bit stream according to a probability distribution to thereby generate symbols including quantized coefficient types of symbols. Entropy decoding schemes are similar to the above-described entropy encoding schemes.

When an entropy decoding scheme applies, a less number of bits are assigned to a symbol having a higher probability of occurrence, with a more number of bits assigned to a symbol having a lower probability of occurrence, so that the size of the bit stream for each symbol may be reduced. Accordingly, compression performance of image decoding may be increased through the entropy decoding scheme.

A quantized coefficient may be inverse-quantized in the inverse-quantization unit 220, and inverse-transformed in the inverse-transform unit 230. As a result of inverse quantization/inverse transform of the quantized coefficient, a reconstructed residual block may be generated.

In the intra mode, the intra prediction unit 240 may generate a prediction block by performing spatial prediction using a pixel value of an already encoded/decoded block adjacent to a current block. In the inter mode, the motion compensation unit 250 may generate a prediction block by performing motion compensation using a reference image stored in the reference picture buffer 270 and a motion vector.

The reconstructed residual block and prediction block are added to each other through the adder 255, and the resultant block may go through the filter unit 260. The filter unit 260 may apply at least one or more of a deblocking filter, SAO, and ALF to a reconstructed block or a reconstructed picture. The filter unit 260 may output a reconstructed image, i.e., a reconstructed image. The reconstructed image may be stored in the reference picture buffer 270 and may be used for inter prediction.

Hereinafter, the "unit" means a basis on which image encoding and decoding are carried out. Upon image encoding and decoding, a unit for encoding or decoding is the one split from an image for purposes of encoding or decoding, and thus, the unit may be also referred to as a block, a coding unit (CU), a prediction unit (PU), a transform unit (TU), etc. Further, the unit may be also denoted as a block in some embodiments to be described below. One unit may be further split into sub units having a smaller size. Further, the "current block" used herein may refer to a block that is targeted for intra prediction or motion compensation. In case intra prediction is performed, the current block may mean any one of a prediction unit, a prediction block, a transform unit, and a transform block, and in case motion compensation is performed, the current block may mean one of a prediction unit and a prediction block.

Figure 3:
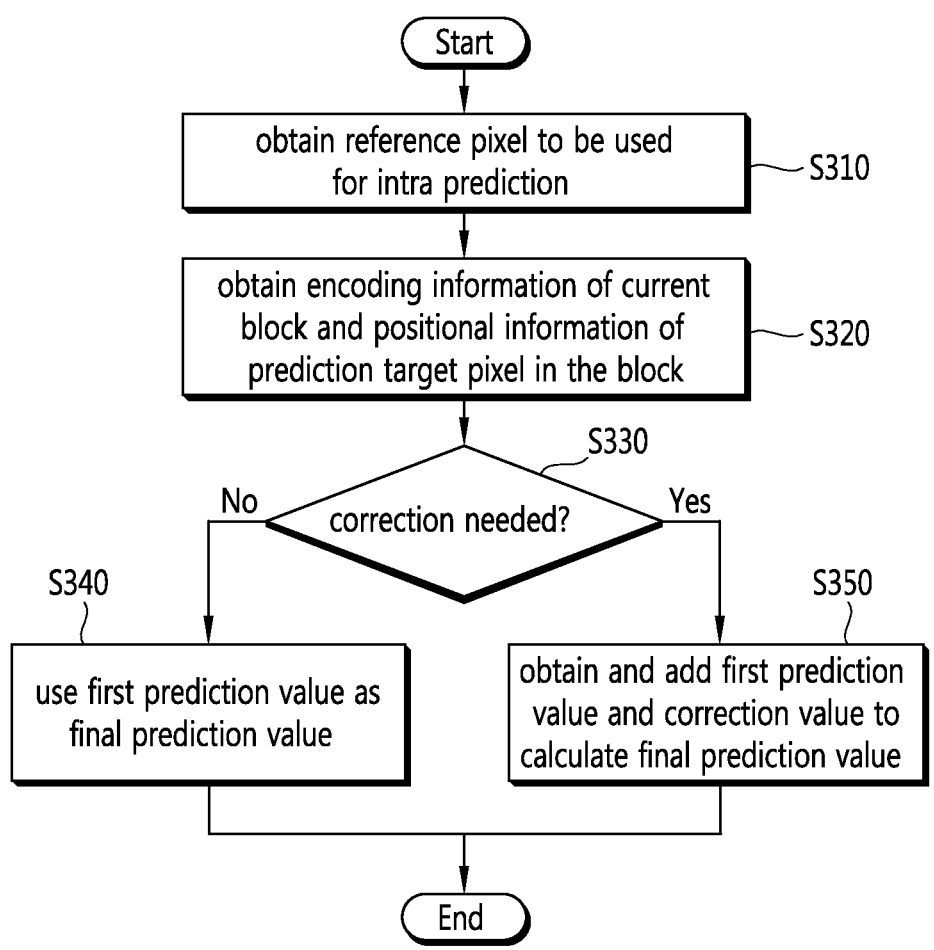
FIG. 3 is a flowchart illustrating a process of producing a final prediction value of a current block in an image encoding/decoding method according to an embodiment of the present invention.

FIG. 3 is a flowchart illustrating a process of producing a final prediction value of a current block in an image encoding/decoding method according to an embodiment of the present invention.

Referring to FIG. 3, an image encoding/decoding apparatus according to an embodiment of the present invention produces a final prediction value based on a reference pixel to generate a prediction block for a current block. For this purposes, the image encoding/decoding apparatus obtains a pixel value of a reference pixel to be used for intra prediction (S310). An already reconstructed pixel of pixels adjacent to the current block may be used as the reference pixel. if the adjacent pixels are unavailable, the pixel values of the unavailable pixels may be replaced with the value of the corresponding reference pixel. After the reference pixel is obtained, encoding information of the current block and in-block position information of a prediction target pixel are obtained (S320). Then, it is determined whether it is needed to correct a first prediction value through the reference pixel value based on the encoding information and the in-block position information of the prediction target pixel (S330). At this time, the determination may be changed based on at least one of intra (intra-frame) prediction mode information, brightness signal information, color difference signal information and block size.

In case it is determined that no correction is needed, the image encoding/decoding apparatus may directly utilize the first prediction value as the final prediction value of the current block (S340). On the contrary, if a correction is determined to be required, the image encoding/decoding apparatus may first obtain the first prediction value and a corrected value and may add the first prediction value to the corrected value to thereby yield a final prediction value (S350). At this time, the complexity of computation associated with the calculation of the corrected value is generally very high, so that it may be considered for purposes of reducing such complexity to conduct an arithmetic right shift operation. The arithmetic right shift operation (">>") has the characteristic that the sign of a value targeted for the operation does not vary, and in contrast to the common integer dividing operation ("/") which renders a result rounded to be close to 0, leaves a result rounded to reach negative infinity.

Figure 4:
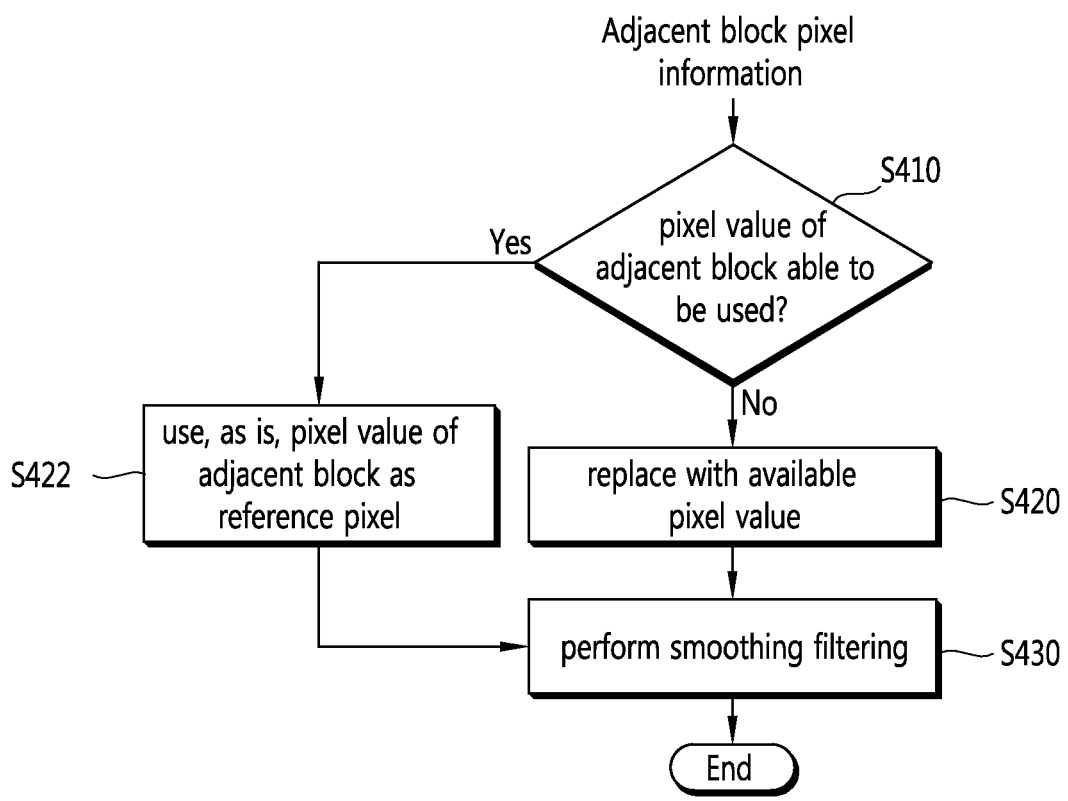
FIG. 4 is a flowchart schematically illustrating a process of yielding a reference pixel to be used for intra prediction according to an embodiment of the present invention.

FIG. 4 is a flowchart schematically illustrating a process of yielding a reference pixel to be used for intra prediction according to an embodiment of the present invention.

Referring to FIG. 4, an encoding/decoding apparatus determines whether a pixel value of an adjacent block may be used based on pixel information of an adjacent block of a current block (S410). At this time, when no pixel value of the adjacent block may be used may be one of i) when the pixel of the adjacent block is outside a picture boundary, ii) when the pixel of the adjacent block is outside a slice/tile boundary, and iii) when CIP (constrained_intra_pred_flag) is 1—that is, when the current block is a CIP-applied block and the adjacent block is a block encoded by inter prediction. As such, in case the pixel value of the adjacent block may not be used as a reference pixel value, the corresponding reference pixel value may be replaced with an available pixel value of another adjacent block or a specific default (S420).

Figure 5:
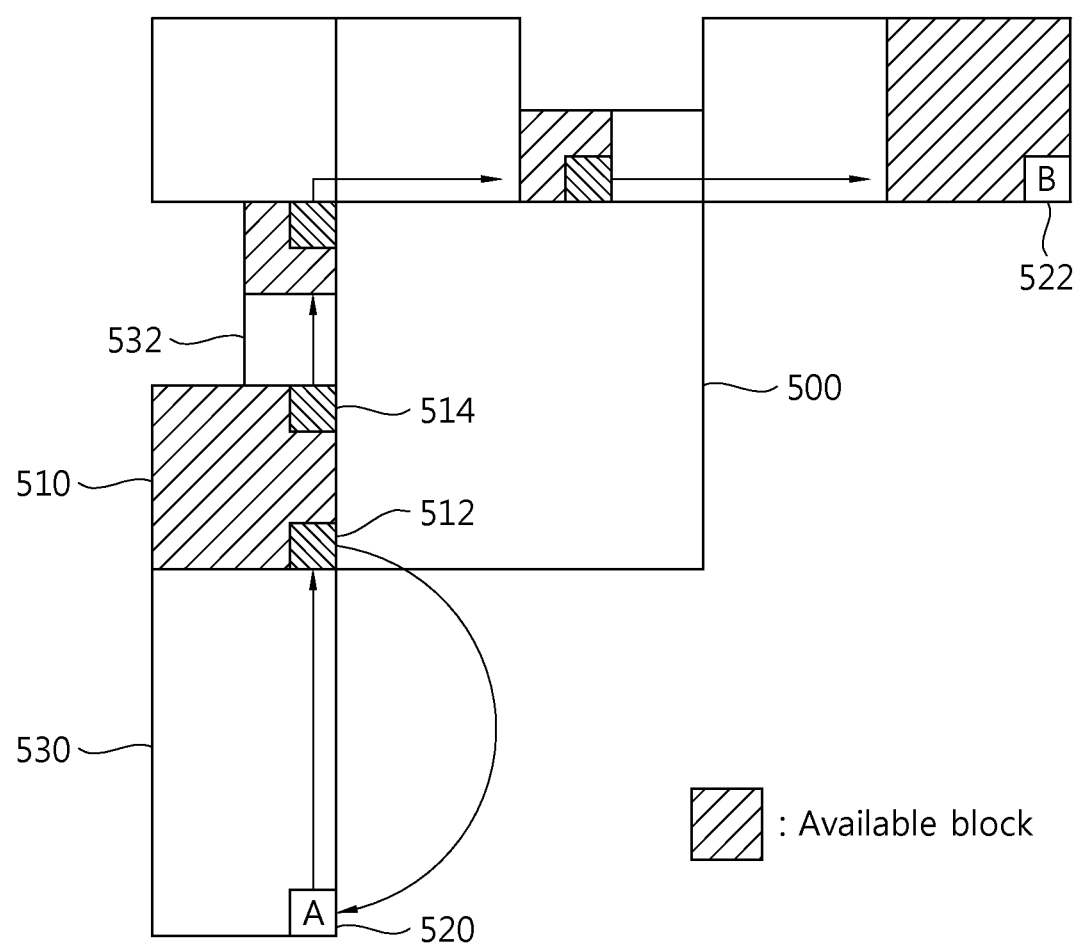
FIG. 5 is a view schematically illustrating the replacement of an unavailable pixel in a process of yielding a reference picture to be used for intra prediction according to an embodiment of the present invention.

FIG. 5 is a view schematically illustrating the replacement of an unavailable pixel in a process of yielding a reference picture to be used for intra prediction according to an embodiment of the present invention.

Referring to FIG. 5, adjacent blocks of a current block 500 may be used to obtain a reference pixel value. At this time, as adjacent blocks to be used for obtaining a reference pixel value, there may be an adjacent block adjacent to the current block 500, an adjacent block adjacent to a lower side of a left and lowermost adjacent block by the height of the current block 500, and an adjacent block adjacent to a right side of a top and rightmost adjacent block by the width of the current block 500. At this time, among pixels of the adjacent blocks, only pixels positioned adjacent to the current block 500 may be used as the reference pixel.

At this time, in case the adjacent blocks may not be used to obtain the reference pixel value, it may be replaced with an available pixel value of another adjacent block. In FIG. 5, among the adjacent blocks of the current block 500, hatched ones are available blocks, and the others are unavailable blocks.

According to an embodiment of the present invention, the image encoding/decoding apparatus may determine whether a pixel positioned adjacent to the current block 500 is available, and may store a result of the determination. For example, the apparatus may determine that, in FIG. 5, pixels in the hatched blocks are available ones and pixels in the non-hatched blocks are unavailable and may store a result. At this time, in case one or more unavailable pixels are present, the unavailable pixel values may be replaced with an available pixel value.

Shifting from a pixel 520 at position A as a start point to a pixel 522 at position B, an unavailable pixel may be replaced with an available pixel value that comes right before the unavailable pixel. At this time, in case the pixel 520 at the start point is unavailable, the pixel value of an available pixel 512 that comes first when shifting from position A to position B may be replaced with the pixel 520 value of the start point. Among the adjacent blocks 510, 530, and 532, the adjacent block 510 is available, and the adjacent blocks 530 and 532 are unavailable. Accordingly, the pixel 520 at the start point is an unavailable pixel. The pixel 520 at the start point may be replaced with the pixel value of an available pixel 512 that first comes as goes from position A to position B, a pixel of the adjacent block 530 may be replaced with the pixel value of the pixel 512, and a pixel of the adjacent block 532 may be replaced with the pixel value of a pixel 514 that is an available pixel coming right before it. In such way, unavailable pixels may be replaced with available pixels until reaching position B.

Turning back to FIG. 4, in case a result of determining whether adjacent block pixels are available shows that the pixel value of an adjacent block is available, the pixel value of the adjacent block may be, as is, used as the reference pixel value (S422).

The image encoding/decoding apparatus may perform smoothing filtering on an obtained reference pixel value (S430). At this time, the smoothing filtering may be conducted in a different way according to the size of a target block and/or intra prediction mode.

Figure 6:
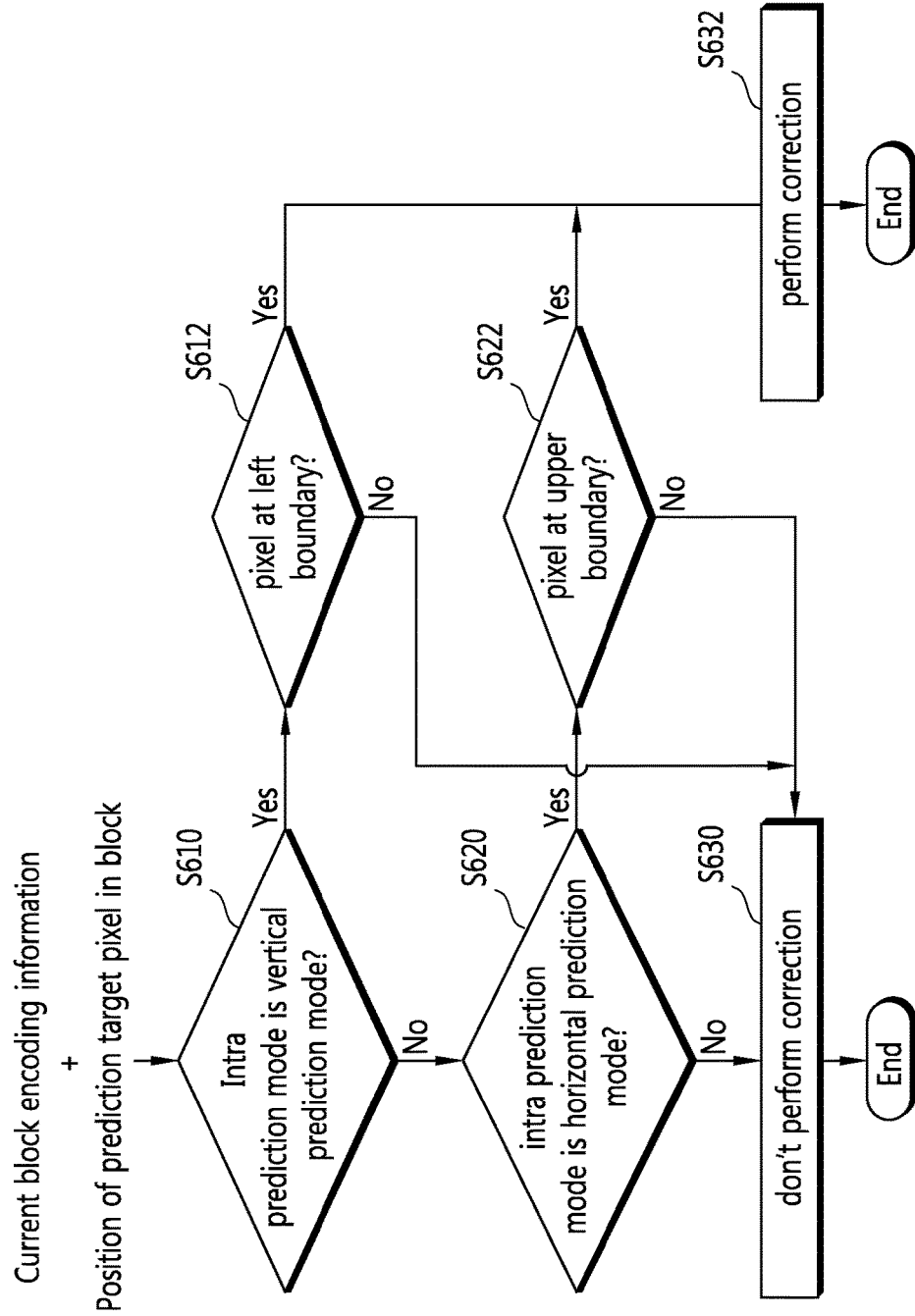
FIG. 6 is a flowchart schematically illustrating a process of determining whether to correct an intra prediction value depending on the position of a prediction target pixel and encoding information of a current block.

FIG. 6 is a flowchart schematically illustrating a process of determining whether to correct an intra prediction value depending on the position of a prediction target pixel and encoding information of a current block.

Referring to FIG. 6, the image encoding/decoding apparatus may determine whether to perform correction based on an in-block position of a prediction target pixel and current block encoding information. The encoding information used for determining whether to perform correction may include any one of intra prediction mode information, brightness signal information, color difference signal information, and block size, as described above.

In order to determine whether to perform correction, the image encoding/decoding apparatus first determines whether an intra prediction mode of a current block is a vertical prediction mode (S610). In the vertical prediction mode, it is determined whether the prediction target pixel is a pixel positioned at a left boundary of the current block (S612). If it is determined as a pixel positioned at the left boundary, correction is determined to be performed (S632). In case the intra prediction mode is the vertical prediction mode but the pixel is not positioned at the left boundary, no correction may be performed (S630). Determination on the vertical prediction mode and horizontal prediction mode may be conducted with reference to what is to be described below. In determining the horizontal prediction mode, it may be strictly determined whether the prediction direction is exactly the horizontal direction, but further eased conditions may apply to determine whether the prediction direction is close to the horizontal direction. As an example of horizontal prediction mode determination using mitigated conditions, if upon horizontal prediction mode determination, the prediction direction of the target prediction mode is within 30 degrees of the horizontal direction, it may be determined as the horizontal prediction mode. At this time, the degree, as a reference of the determination, is not necessarily limited to 30 degrees, and other angles may be also used as the reference. Also in determining the vertical prediction mode, as in determining the horizontal prediction mode, more smooth conditions may be used to determine whether the prediction direction is close to the vertical direction or not. Although in the subsequent embodiments it is strictly determined whether the prediction direction is the horizontal and vertical directions, the present invention is not limited thereto, and examples where determination on the horizontal and/or vertical directions is made based on the mitigated conditions as described above also belong to the scope of the present invention.

Then, whether it is a horizontal prediction mode is determined (S620). The steps of determining the vertical prediction mode and horizontal prediction mode (S610 and S620) are not essentially associated with each other, and the order of performing the steps S610 and S620 may be changed. In the case of the horizontal prediction mode, it is determined whether the prediction target pixel is a pixel positioned at an upper boundary of a current block (S622). If it is determined that the prediction target pixel is a pixel positioned at the upper boundary, correction is determined to be performed (S632). In case the intra prediction mode is a horizontal prediction mode but the pixel is not positioned at the upper boundary, no correction may be performed (S630). In case the intra prediction mode is not a vertical or horizontal prediction mode, no correction on a prediction value for a current block may be conducted (S630).

According to an embodiment of the present invention, correction on the prediction value for the current block may be done in consideration of at least one of the intra prediction mode and block size as described above only with respect to the brightness (luma) signal, but not with respect to the color difference (chroma) signal.

According to another embodiment of the present invention, prediction value correction may be conducted on a block having a size of 32×32 or less. In other words, prediction value correction may be performed on a block having a size of 4×4, 8×8, and 16×16.

According to still another embodiment of the present invention, in case the inter prediction mode is a DC mode, correction may be done on pixels positioned at the top and left boundaries of a current block.

Figure 7A:
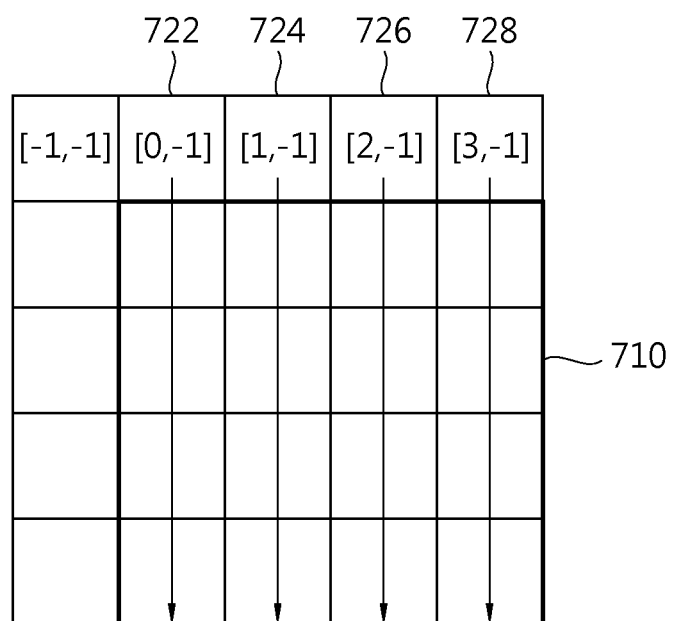
FIG. 7a is a view schematically illustrating an embodiment in which in a vertical prediction mode a first prediction value for a pixel in a current block is used as a final prediction value.
Figure 7B:
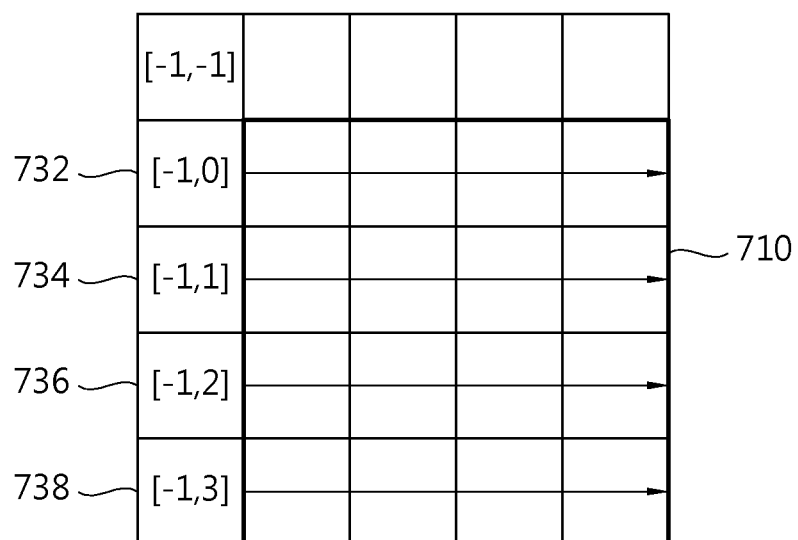
FIG. 7b is a view schematically illustrating an embodiment in which in a horizontal prediction mode a first prediction value for a pixel in the current block is used as the final prediction value.

FIG. 7a is a view schematically illustrating an embodiment in which in a vertical prediction mode a first prediction value for a pixel in a current block is used as a final prediction value, and FIG. 7b is a view schematically illustrating an embodiment in which in a horizontal prediction mode a first prediction value for a pixel in the current block is used as the final prediction value.

Referring to FIGS. 7a and 7b, the image encoding/decoding apparatus obtains a first prediction value and then determines, without correction, the first prediction value as a final prediction value for the current block 710 when it is determined in the step S330 that no correction is to be performed on the prediction value depending on at least one of intra prediction mode, brightness signal, color difference signal information and block size.

At this time, the first prediction value (pred1[x,y]) may be obtained based on a reference pixel value. p[x,y] to be described below means the reference pixel value at position [x,y]. Thereafter, in an embodiment, x=-1, ..., Block-Width-1, y=-1, ..., BlockHeight-1. Here, BlockWidth refers to the width of a current block, and BlockHeight refers to the height of a current block. In the embodiments described in connection with FIGS. 7a and 7b, a 4×4 block is described as an example, and in such case, the reference pixel may have a range of x=-1, ..., 3 and y=-1, ..., 3, and the pixel of the current block may have a range of x=0, ..., 3 and y=0, ..., 3.

Referring to FIG. 7a, in the case of vertical direction prediction, the first prediction value (pred1[x,y]) may be determined as values (722, 724, 726, 728) of upper reference pixels adjacent to the current block.

$$pred1[x, y] = p[x, -1](x = 0, \ldots, BlockWidth - 1; y = 0, \ldots, BlockHeight - 1)$$ [Equation 1]

Assuming that the left and upper side of the current block is positioned at [0,0], the first prediction value (pred1[x,y]) is determined using the pixel value of a pixel 722 positioned at [0,-1] with respect to pixels at the left boundary of the current block 710, the pixel value of a pixel 724 positioned at [4,-1] with respect to pixels at the second column from the left side, the pixel value of a pixel 726 positioned at [2,-1] with respect to pixels at the third column from the left side, and the pixel value of a pixel 728 positioned at [3,-1] with respect to pixels at the right boundary.

The image encoding/decoding apparatus may use the first prediction value (pred1[x,y]) as the final prediction value (predS[x,y]).

$$predS[x, y] = pred[x, y](x = 0, \ldots, BlockWidth - 1; y = 0, \ldots, BlockHeight - 1)$$ [Equation 2]

Here, predS[x,y] refers to a final prediction value.

Referring to FIG. 7b, in the case of horizontal direction prediction, the first prediction value (pred1[x,y]) may be determined as values of left reference pixels (732, 734, 736, 738) adjacent to the current block.

$$pred1[x, y] = p[-1, y](x = 0, \ldots, BlockWidth - 1; y = 0, \ldots, BlockHeight - 1)$$ [Equation 3]

The first prediction value (pred1[x,y]) is determined using the pixel value of a pixel 732 positioned at [-1,0] with respect to pixels at an upper boundary, the pixel value of a pixel 734 positioned at [-1,1] with respect to pixels at the second row from the upper side, the pixel value of a pixel 736 positioned at [-1,2] with respect to pixels at the third row from the upper side, and the pixel value of a pixel 738 positioned at [-1,3] with respect to the lower boundary. As in the vertical direction prediction, even in the horizontal direction prediction, the first prediction value (pred1[x,y]) may be used as the final prediction value (predS[x,y]).

Figure 8:
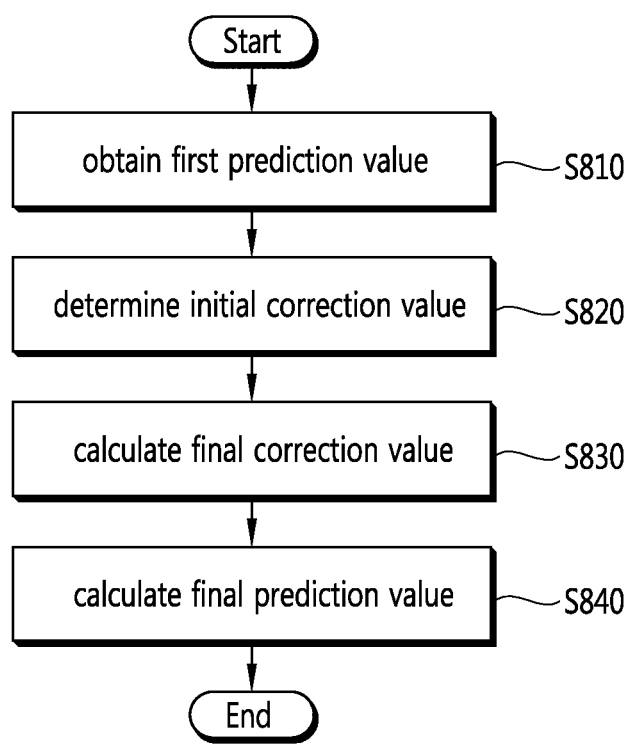
FIG. 8 is a flowchart schematically illustrating an embodiment in which correction is performed on a first prediction value for a pixel in a current block to yield a final prediction value.

FIG. 8 is a flowchart schematically illustrating an embodiment in which correction is performed on a first prediction value for a pixel in a current block to yield a final prediction value.

Referring to FIG. 8, the image encoding/decoding apparatus obtains a first prediction value (pred1[x,y]) through a scheme of utilizing the above-described reference pixel values (refer to FIGS. 7a and 7b) in case it is determined in step S330 that correction is to be performed on the prediction value according to at least one of an intra prediction mode, bright signal, color difference signal information and block size (S810).

Then, the apparatus determines an initial correction value (d[x,y]) for the first prediction value (pred1[x,y]) of a prediction target pixel (S820). The initial correction value (d[x,y]) may be determined depending on the horizontal or vertical position of the prediction target pixel in the block. In other words, in the case of vertical direction prediction, the initial correction value (d[x,y]) may be determined according to the vertical-directional position of the prediction target pixel in the block, and in the case of horizontal direction prediction, the initial correction value (d[x,y]) may be determined according to the horizontal-directional position of the prediction target pixel in the block.

$$d[x, y] = d[y] = p[-1, y] - p[-1, -1]$$ [Equation 4]

(in case of vertical direction prediction mode)

$$d[x, y] = d[x] = p[x, -1] - p[-1, -1]$$

(in case of horizontal direction prediction mode)

In Equation 4, the differentials may be changed in terms of direction as in Equation 4'.

$$d[x, y] = d[y] = p[-1, -1] - p[-1, y]$$ [Equation 4']

(in case of vertical direction prediction mode)

$$d[x, y] = d[x] = p[-1, -1] - p[x, -1]$$

(in case of horizontal direction prediction mode)

Next, a final correction value (delta[x,y]) is yielded based on the initial correction value (d[x,y]) (S830). At this time, computation efficiency may be elevated by producing the final correction value (delta[x,y]) through arithmetic right shift showing a relatively low computation complexity without performing division or multiplication operation with a high computation complexity. In other words, the final correction value (delta[x,y]) is obtained by arithmetically right-shifting a two's complementary integer representation for the initial correction value (d[x,y]) by a binary digit of M. At this time, the MSB (Most Significant Bit) of the arithmetically right-shifted final correction value (delta[x, y]) is the same as the MSB of the initial correction value (d[x,y]), and the final correction value (delta[x,y]) has the characteristic of being rounded in the direction of approaching negative infinity.

$$\text{delta}[x, y] = d[x, y] \gg M$$ [Equation 5]

At this time, the binary digit M is preferably 1 or 2.

Finally, the first prediction value (pred1[x,y]) is added to the final correction value (delta[x,y]), thus yielding the final prediction value (predS[x,y]).

$$predS[x, y] = Clip1Y(pred1[x, y] + delta\ [x, y])\ \text{Here},$$ [Equation 6]

$$Clip1_Y(x) = Clip3(0, (1 << BitDepthY) - 1, x),$$

$$Clip3(x, y, z) = \begin{cases} x; & z < x \\ y; & z > y \\ z; & \text{otherwise} \end{cases},$$

and

BitDepthY denotes a bit depth of a brightness signal.

According to another embodiment of the present invention, a plurality of schemes may be used to generate the initial correction value (d[x,y]) and produce the final correction value (delta[x,y]) using the initial correction value (d[x,y]). First, according to a first embodiment, the final correction value (delta[x,y]) may be produced through an arithmetic right shift operation after performing conditional analysis on the initial correction value. According to the first embodiment, the following equation may be used to calculate a correction value so that the correction value is rounded to be close to 0.

$$delta\ [x, y] = (d[x, y] + (d[x, y] < 0\ ?\ 2^x : 0)) >> (x + 1)$$ [Equation 7]

(in case of vertical direction prediction mode)

$$delta\ [x, y] =$$
$$(d[x, y] + (d[x, y] < 0\ ?\ 2^y : 0)) >> (y + 1)$$

(in case of horizontal direction prediction mode)

Further, according to a second embodiment, the following equation may be used to calculate a correction value so that the correction value is rounded to be an integer away from 0.

$$delta\ [x, y] = (d[x, y] + (d[x, y] < 0\ ?\ 1 + 2^x : 0)) >> (x + 1)$$ [Equation 8]

(in case of vertical direction prediction mode)

$$delta\ [x, y] =$$
$$(d[x, y] + (d[x, y] < 0\ ?\ 1 + 2^y : 0)) >> (y + 1)$$

(in case of horizontal direction prediction mode)

Further, according to a third embodiment, the following equation may be used to calculate a correction value so that the correction value is rounded to an integer close to negative infinity. At this time, Equation 9 may apply only to a left boundary of a current block using the vertical direction prediction mode and an upper boundary of the current block using the horizontal direction prediction mode, and in such case, Equation 9 is the same as Equation 5 when M is 1.

$$delta\ [x, y] = d[x, y] >>$$ [Equation 9]

$$(x + 1)(\text{in case of vertical direction prediction mode})$$

$$delta\ [x, y] = d[x, y] >>$$

$$(y + 1)(\text{in case of horizontal direction prediction mode})$$

According to a fourth embodiment of the present invention, the initial correction value (d[x,y]) may be generated, and then, a Sign operation and an Abs operation may be used to calculate the final correction value (delta[x,y]) based on the initial correction value (d[x,y]). In such case, the final correction value (delta[x,y]) may be obtained by multiplying a value obtained by performing a Sign operation on the initial correction value by a value obtained by performing arithmetic right shift on an absolute value of the initial correction value. At this time, the final correction value may be calculated so that the obtained final prediction value is rounded to be an integer close to 0.

$$delta\ [x, y] =$$ [Equation 10]

$$Sign\ (d[x, y]) * ((Abs(d[x, y]) + 2^x) >> (x + 1))$$

(in case of vertical direction prediction mode)

$$delta\ [x, y] =$$

$$Sign\ (d[x, y]) * ((Abs(d[x, y]) + 2^y) >> (y + 1))$$

(in case of horizontal direction prediction mode)

Further, the final correction value according to a fifth embodiment based on the Sign operation and Abs operation may be obtained by multiplying a value obtained by performing a Sign operation on the initial correction value by a value obtained by performing an addition operation on an absolute value of the initial correction value and then performing an arithmetic right shift on a resultant value of the addition operation. At this time, the final correction value may be calculated so that the calculated final prediction value is rounded to be an integer away from 0.

$$delta\ [x, y] =$$ [Equation 11]

$$Sign\ (d[x, y]) * ((Abs(d[x, y]) + 2^x) >> (x+1))$$

(in case of vertical direction prediction mode)

$$delta\ [x, y] =$$

$$Sign\ (d[x, y]) * ((Abs(d[x, y]) + 2^y) >> (y+1))$$

(in case of horizontal direction prediction mode)

Then, based on the final correction value obtained in the first to fifth embodiments, the first prediction value (predS[x,y]) may be added to the final correction value (delta[x,y]) to thereby produce the final prediction value (predS[x,y]).

Figure 9A:
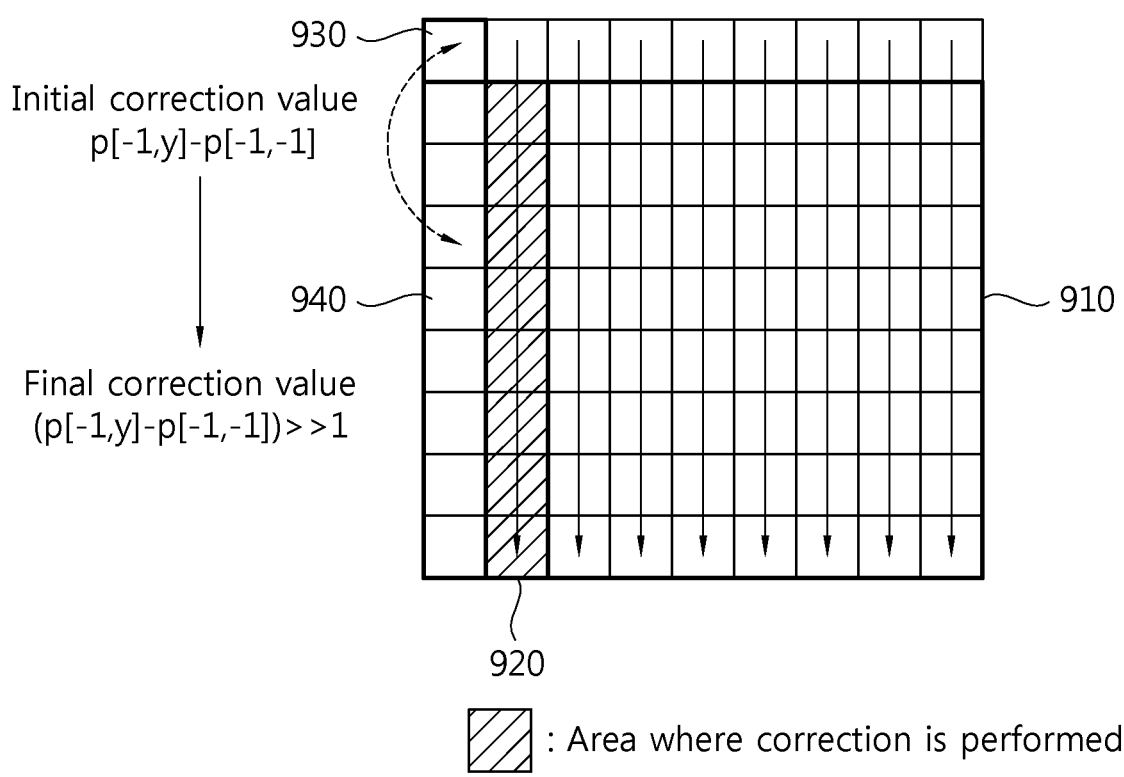
FIG. 9a is a view schematically illustrating an embodiment for producing a final prediction value by performing correction on a first prediction value when using a vertical mode.

FIG. 9a is a view schematically illustrating an embodiment for producing a final prediction value by performing correction on a first prediction value when using a vertical mode.

Referring to FIG. 9a, the image encoding/decoding apparatus determines a pixel value of an upper reference pixel of a current block 910 as a first prediction value (pred1[x,y]=p[x,−1]) when performing intra prediction through a vertical direction prediction mode.

Then, the apparatus performs correction targeting pixels 920 positioned at a left boundary of the current block 910. To perform correction on the first prediction value, an initial correction value is first determined. At this time, the initial correction value is determined depending on the vertical position of a prediction target pixel. That is, a difference between the value of a left reference pixel 940 corresponding to the prediction target pixel and the value of a left and upper cornered pixel 930 may become the initial correction value (d[x,y]=d[y]=p[−1,y]−p[−1,−1]). As described above, the initial correction value is present only when x=0 in case of the left boundary, and may be otherwise 0.

Next, a final correction value is calculated by arithmetic right-shifting a two's complementary integer representation for the initial correction value by a binary digit of 1 (delta[x,y]=d[x,y]>>1=(p[−1,y]−p[−1,−1])>>1).

Finally, the first pixel value is added to the final correction value, thus yielding a final prediction value (predS[x,y]=Clip1$_Y$(pred1[x,y]+delta[x,y]).

Figure 9B:
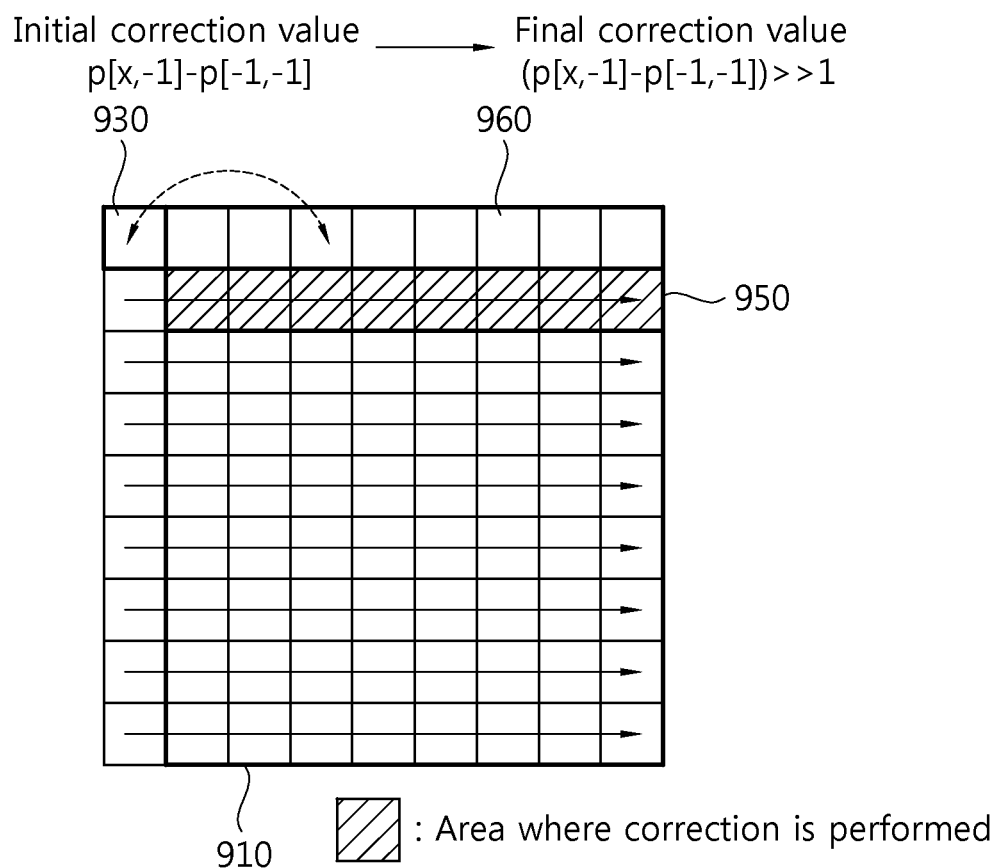
FIG. 9b is a view schematically illustrating an embodiment for producing a final prediction value by performing correction on a first prediction value when using a horizontal mode.

FIG. 9b is a view schematically illustrating an embodiment for producing a final prediction value by performing correction on a first prediction value when using a horizontal mode.

Referring to FIG. 9b, the image encoding/decoding apparatus determines a pixel value of a left reference pixel of a current block 910 as a first prediction value (pred1[x,y]=p[−1,y]) in the case of performing intra prediction through a horizontal direction prediction mode.

Then, the apparatus performs correction on pixels 950 positioned at an upper boundary of the current block 910. An initial correction value is determined depending on a horizontal position of a prediction target pixel so as to perform correction on the first prediction value. That is, a difference between the value of an upper reference pixel 960 corresponding to the prediction target pixel and the value of a left and upper cornered pixel 930 may become the initial correction value (d[x,y]=d[x]=p[x,−1]−p[−1,−1]). As described above, the initial correction value is present only when y=0 in the case of the upper boundary, and may be otherwise 0.

Next, a final correction value may be calculated by arithmetic right shifting a two's complementary integer representation for the initial correction value by a binary digit of 1 (delta[x,y]=d[x,y]>>1=(p[x,−1]−p[−1,−1])>>1), and the first prediction value is added to the final correction value, thus yielding a final prediction value (predS[x,y]=Clip1$_Y$(pred1 [x,y]+delta[x,y]).

Figure 10:
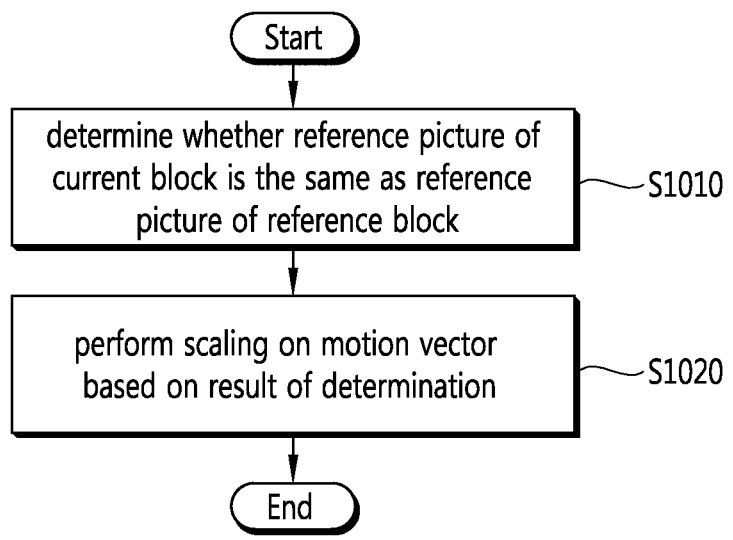
FIG. 10 is a flowchart schematically illustrating a process of performing scaling in an image encoding/decoding method according to another embodiment of the present invention.

FIG. 10 is a flowchart schematically illustrating a process of performing scaling in an image encoding/decoding method according to another embodiment of the present invention.

Referring to FIG. 10, the image encoding/decoding apparatus according to the other embodiment of the present invention may perform scaling to produce a motion vector of a prediction block when performing inter prediction or motion compensation on a current block. For this purpose, the image encoding/decoding apparatus determines whether a reference picture of the current block is the same as a reference picture of a reference block (S1010). At this time, the image encoding/decoding apparatus may determine whether reference picture indexes indicating reference pictures in a reference picture list are the same, but not only the sameness of the reference picture. Then, depending on a result of the determination, the image encoding/decoding apparatus determines whether to perform scaling a motion vector of the reference block (S1020). In case the reference pictures are the same, no scaling on the motion vector of the reference block may be done, but otherwise, scaling for the motion vector of the reference block is required. The scaled motion vector of the reference block serves as a basis for the motion vector of the current block and may be used for inter prediction of the current block.

Meanwhile, as inter prediction schemes applicable to the inter prediction through scaling, there may be an AMVP (Advanced Motion Vector Prediction) or a merge mode. In particular, in the merge mode, the scheme may be applicable to a temporal merge candidate inducing process in the merge mode and to a temporal motion vector inducing process and a spatial motion vector inducing process in the AMVP.

Figure 11A:
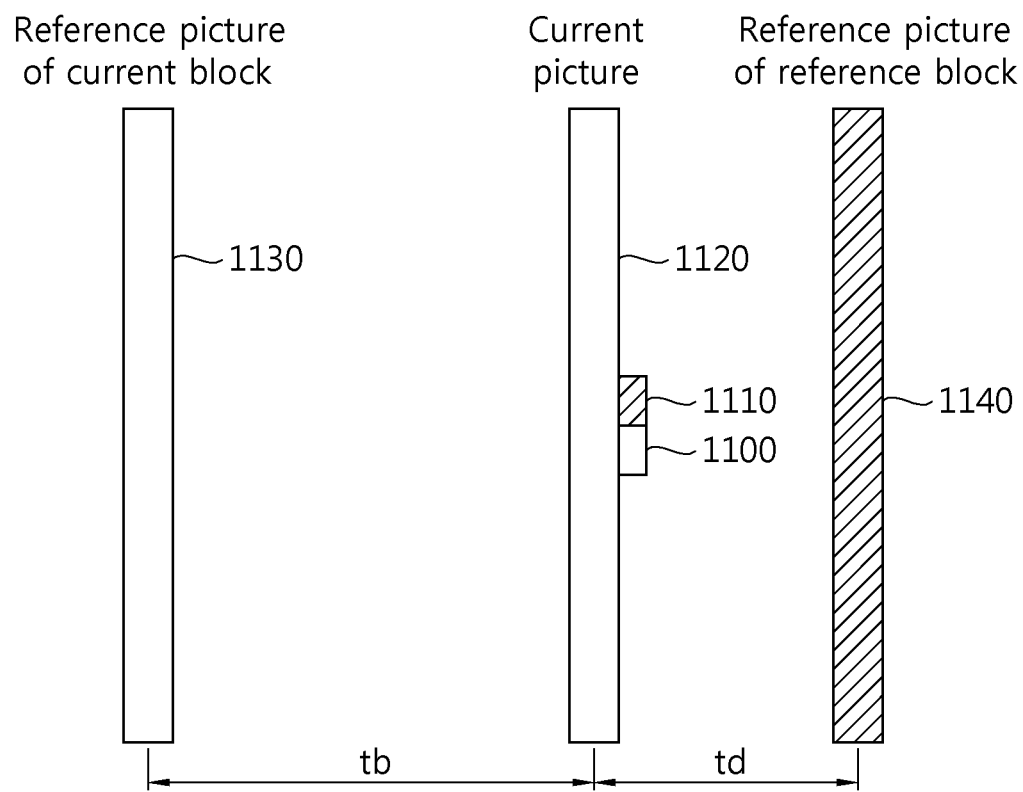
FIG. 11a is a view illustrating a POC difference between a current picture and a current picture of a spatial reference block and a POC difference between the current picture and a reference picture of the current block.

FIG. 11a is a view illustrating a POC difference between a current picture and a current picture of a spatial reference block and a POC difference between the current picture and a reference picture of the current block.

Referring to FIG. 11a, the reference block 1110 for inducing a spatial motion vector candidate among adjacent blocks of the current block 1100 may be at least one of a lowermost block adjacent to the left side of the current block 1100, a block adjacent to the lower side of the left and lowermost block, a left and upper cornered block of the current block, a right and upper cornered block of the current block and an upper and rightmost block adjacent to the current block. At this time, for the motion vector of the reference block 1110 to be able to be used for prediction of the current block 1100 without performing scaling, the reference picture 1140 of the reference block 1110 needs to be the same as the reference picture 1130 of the current block 1100, and the motion vector of the reference block 1110 may be otherwise subjected to scaling and may be then used for prediction of the current block 1100. That is, it may be determined whether tb indicating a difference between the reference picture 1130 of the current block and POC (Picture Order Count) of the current picture 1120 is the same as td indicating a POC difference between the current picture 1120 and the reference picture 1140 of the reference block 1110, and if the two are the same, no scaling is performed, and if the two are not the same, a scaling process may be done.

Figure 11B:
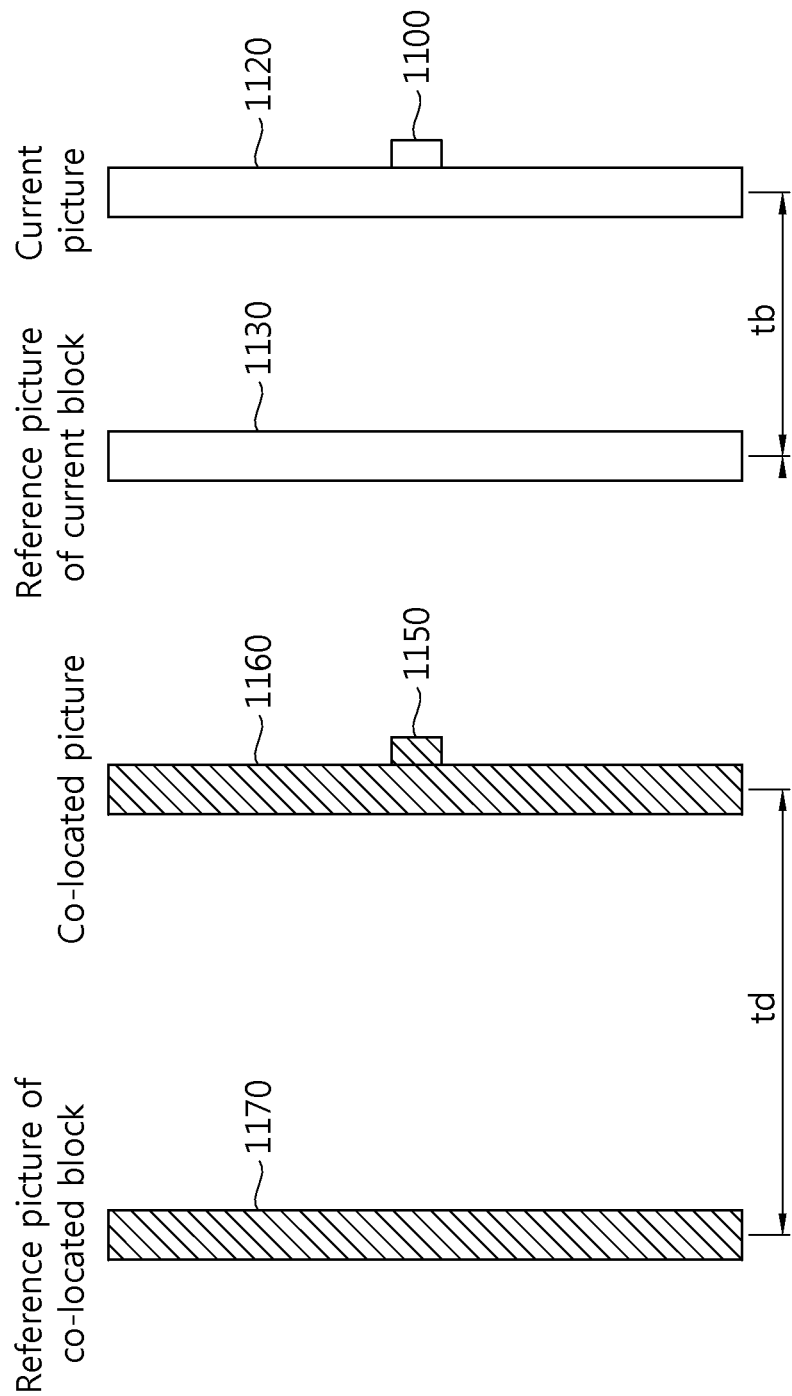
FIG. 11b is a view illustrating a POC difference between a reference picture of a co-located block and a co-located picture and a POC difference between a current picture and a reference picture of a current block.

FIG. 11b is a view illustrating a POC difference between a reference picture of a co-located block and a co-located picture and a POC difference between a current picture and a reference picture of a current block.

Referring to FIG. 11b, the image encoding/decoding apparatus may perform prediction of the current block 1100 based on a motion vector of a reference block associated with the co-located block 1150 at a location corresponding to the current block 1100 in an already reconstructed co-located picture 1160. That is, as a reference block for inducing a temporal motion vector or a temporal merge candidate, a block positioned in or outside the co-located block. The reference block may be determined according to a relative position of a right and lower cornered block of the co-located block or a right and lower block among four square blocks with respect of the center of the co-located block.

At this time, in using the motion vector of the temporal reference block, it is determined whether td indicating a POC difference between a reference picture 1170 referred to by the co-located block 1150 and the co-located picture 1160 is the same as tb indicating a POC difference between the reference picture 1130 referred to by the current block 1100 and the current picture 1120. A determination may be made so that if the two values are the same, no scaling is performed, and if the two values are not the same, a scaling process is performed.

Figure 12:
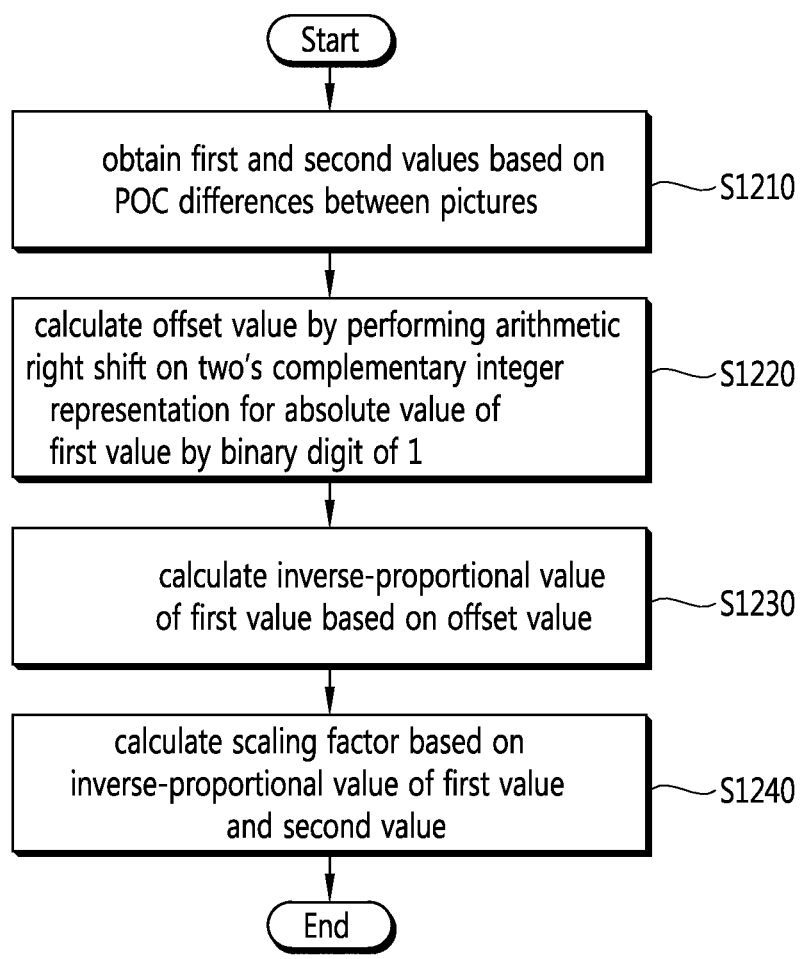
FIG. 12 is a flowchart schematically illustrating an embodiment of a process of calculating a scaling factor for a motion vector based on POC differences between pictures.

FIG. 12 is a flowchart schematically illustrating an embodiment of a process of calculating a scaling factor for a motion vector based on POC differences between pictures.

As shown in FIG. 12, the image encoding/decoding apparatus obtains td and tb indicating POC differences between pictures so as to calculate a scaling factor (S1210). Here, the first value may refer to td, and the second value may refer to tb. As described above, i) in the process of inducing a spatial motion vector (refer to FIG. 11a), td denotes a difference between a POC of a current picture and a POC of a reference picture referred to by a spatially adjacent reference block, and tb denotes a difference between a POC of a current picture and a POC of a reference picture referred to by the current block. At this time, the reference picture of the current block and the reference picture of the reference block may have different prediction directions, and in such case, td and tb may be assigned with different signs. In some cases, td or tb may be adjusted to be included in a range from −128 to 127. At this time, if td or tb is smaller than −128, td or tb may be adjusted to −128, and if td or tb is larger than 127, td or tb may be adjusted to 127. If td or tb is included in a range between −128 and 127, no adjustment is made to td or tb.

$$td = Clip3(-128, 127, PicOrderCnt(currPic) - \quad \text{[Equation 12]}$$
$$RefPicOrder(currPic, refIdxZ, ListZ))$$
$$tb = Clip3(-128, 127, PicOrderCnt(currPic) - $$
$$RefPicOrder(currPic, refIdxLX, LX))$$

Here, currPic may denote a current picture. Further, X may have a value of 0 or 1. For example, if X=0, refIdxLX and LX may be refIdxL0 and L0, respectively, which means variables associated with L0 temporal motion information. Further, refIdxLX may denote an LX reference picture index indicating a reference picture in an LX reference picture list with reference pictures assigned therein. In case refIdxLX is 0, refIdxLX may denote the first reference picture in the LX reference picture list, and in case refIdxLX is −1, refIdxLX may represent no indication of a reference picture in the reference picture list. Further, Z may denote at least one of a lowest block adjacent to the left side which is a position of the reference block for inducing a spatial motion vector, a block adjacent to a lower side of the left and lowermost block, a left and upper cornered block of the current block, a right and upper cornered block of the current block, and an upper and rightmost block adjacent to the current block.

ii) in the process of inducing a temporal motion vector, and iii) in the process of inducing a temporal merge candidate (refer to FIG. 11b), td may denote a difference between a POC of a co-located picture and a POC of a reference picture referred to by a co-located block, and tb may denote a difference between a POC of the current picture and a POC of a reference picture referred to by the current block. In such case, td or tb may be also adjusted to be included in a range between −128 and 127.

$$td = Clip3(-128, 127, PicOrderCnt(colPic) - \quad \text{[Equation 13]}$$
$$RefPicOrder(currPic, refIdxCol, ListCol))$$
$$tb = Clip3(-128, 127, PicOrderCnt(currPic) - $$
$$RefPicOrder(currPic, refIdxLX, LX))$$

Here, colPic may denote a co-located picture. Further, refIdxCol and ListCol may denote a reference picture index of the co-located block and a reference picture list.

Once td and tb are obtained, the image decoding apparatus may yield an offset value by arithmetic right-shifting a two's complementary integer representation for an absolute value of td by a binary digit of 1 (S1220). That is, the offset value may use a value proportional to the absolute value of td and may be calculated by performing an arithmetic right shift having a relatively low complexity without performing a high-complexity operation.

$$\text{offset} = Abs(td) \gg 1 \quad \text{[Equation 14]}$$

At this time, Abs( ) represents an absolute value function, and a value output from the corresponding function is an absolute value of an input value.

After performing the arithmetic right shift, the image encoding/decoding apparatus calculates an inverse-proportional value of td based on the offset value (S1230).

$$tx = (16384 + \text{offset})/td \quad \text{[Equation 15]}$$

After the inverse-proportional value (tx) of td is calculated, a scaling factor is calculated based on tb and the inverse-proportional value (tx) of td (S1240).

Figure 13:
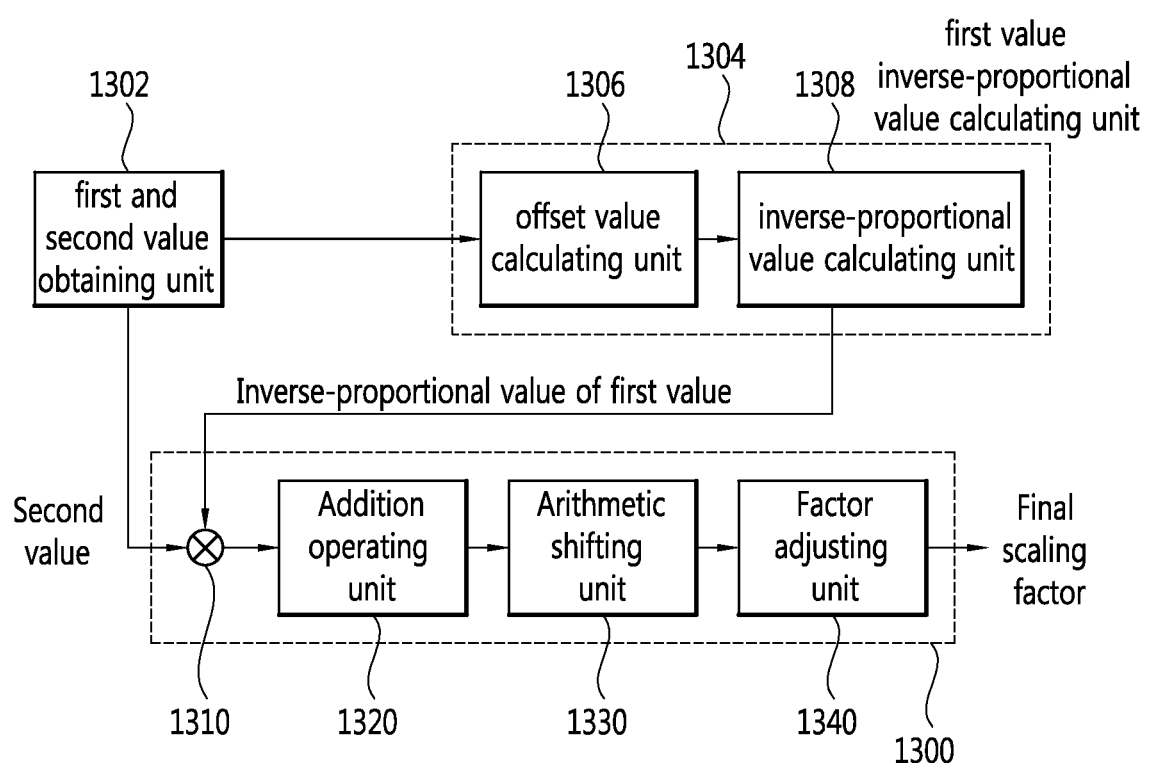
FIG. 13 is a block diagram schematically illustrating a configuration of calculating a final scaling factor based on tb and an inverse-proportional value of td.

FIG. 13 is a block diagram schematically illustrating a configuration of calculating a final scaling factor based on tb and an inverse-proportional value of td. As shown in FIG. 13, the configuration 1300 for calculating the final scaling factor (ScaleFactor) may include a multiplier 1310, an addition operating unit 1320, an arithmetic shifting unit 1330, and a factor adjusting unit 1340.

Referring to FIG. 13, a first and second value obtaining unit 1302 obtains td and tb through the method described in step S1210. Then, an offset value calculating unit 1306 calculates an offset value through the method described in step S1220 based on td, and an inverse-proportional value calculating unit 1308 calculates an inverse-proportional value (tx) of td through the method described in the step S1230 based on the offset value.

The multiplier 1310 receives, as inputs, tb and the inverse-proportional value (tx) of td calculated in the inverse-proportional value calculating unit 1308 and performs multiplication. The addition operating unit 1320 may perform an addition operation based on the multiplication of tb and the inverse-proportional value (tx) of td. At this time, an operation of adding 32 may be performed. Then, the arithmetic shifting unit 1330 performs an arithmetic right shift on a two's complementary integer representation on a resultant value of the addition operation by a binary digit of 6. The operations performed thus far may be represented as follows:

$$\text{ScaleFactor} = (tb * tx + 32) \gg 6 \quad \text{[Equation 16]}$$

Then, the factor adjusting unit 1340 adjusts the scaling factor (ScaleFactor) to be included in a range between −4096 and 4095. Here, adjusting the scaling factor to be included in a specific range (e.g., between A and B) means clipping the factor to A if the scaling factor is smaller than A and to B if the scaling factor is larger than B.

After calculating the scaling factor, the image encoding/decoding apparatus may calculate a scaled motion vector (scaledMV). The scaled motion vector (scaledMV) may be calculated by multiplying the scaling factor (ScaleFactor) by the corresponding motion vector (which may mean a motion vector associated with at least one of spatial motion vector induction, temporal motion vector induction and temporal merge), performing a Sign operation on the resultant value of the multiplication, performing an addition operation and an arithmetic shift operation on an absolute value of the resultant value of the multiplication, and multiplying the Signed value by the resultant value of the addition and arithmetic shift operation.

$$scaledMV = \text{Sign}(ScaleFactor*mv) * \qquad \text{[Equation 17]}$$
$$((\text{Abs}(ScaleFactor*mv) + 127) >> 8)$$

Here, Sign( ) outputs information on the sign of a specific value (e.g., Sign(−1) outputs '−'), and my denotes a motion vector before scaling. At this time, scaling may be performed on each of an x component and a y component of the motion vector.

The image encoding/decoding apparatus may generate a prediction block of a current block using a motion vector scaled as above.

According to another embodiment of the present invention, the above-described scaling factor calculating scheme may be also used in a process of calculating an in-implicit-weighted-prediction scaling factor. The image encoding/decoding apparatus obtains td and tb that denote POC differences between pictures in order to calculate a scaling factor upon performing the implicit weighted prediction.

td may denote a POC of a reference picture referred to by a current picture among reference pictures in a reference picture list 1 and a POC of a reference picture referred to by a current picture among reference pictures in a reference picture list 0, and tb may denote a difference between a POC of a current picture and a POC of a reference picture referred to by the current picture among rep s in the reference picture list 0. At this time, td or tb may be adjusted to be included in a range between −128 and 127. At this time, if td or tb is smaller than −128, td or tb may be adjusted to −128, and if td or tb is larger than 127, td or tb may be adjusted to 127. If td or tb is included in a range between −128 and 127, no adjustment is made to td or tb.

$$td = \qquad \text{[Equation 18]}$$
$$Clip3(-128, 127, PicOrderCnt(currPic, refIdxL1, L1) -$$
$$RefPicOrder(currPic, refIdxL0, L0))$$
$$tb = Clip3(-128, 127, PicOrderCnt(currPic) -$$
$$RefPicOrder(currPic, refIdxL0, L0))$$

Then, the image decoding apparatus may calculate an offset value by performing an arithmetic right shift on a two's complementary integer representation for an absolute of td by a binary digit of 1.

After performing the arithmetic right shift, the image encoding/decoding apparatus calculates an inverse-proportional value (tx=(16384+offset)/td) of td based on the offset value, calculates an inverse-proportional value (tx) of td, and calculates a scaling factor (ScaleFactor=(tb*tx+32)>>6) based on tb and the inverse-proportional value (tx) of td.

In particular, in calculating the in-implicit-weighted-prediction scaling factor, the scaling factor (ScaleFactor) may be adjusted to be included in a range between −1024 and 1023. At this time, in case the distance between images increases, scaling on a weighting factor, which is performed using the distance between images, may not be properly done, and thus, incorrect implicit weighted prediction is performed, thus causing a deterioration of the encoding efficiency. Accordingly, rather than being included in a range between −1024 and 1023, the scaling factor may be adjusted to be included in a range between −4096 and 4065.

At this time, by using the weighting factor, a weighting value for a reference picture in the reference picture list 0 may be determined as 64−(ScaleFactor>>2), and a weighting value for a reference picture in the reference picture list 1 may be determined as ScaleFactor>>2.

Although in the embodiments the methods are described based on flowcharts with a series of steps or blocks, the present invention is not limited to the order, and some steps may be performed simultaneously with or in a different sequence from other steps. Further, it may be understood by those skilled in the art that other steps may be non-exclusively included in the steps of the flowcharts or one or more steps may be removed from the flowcharts without affecting the scope of the present invention.

The above-described embodiments include various aspects of examples. Although all possible combinations of the various aspects of examples may be not described herein, it will be understood by those skilled in the art that such combinations are possible. Accordingly, the present invention includes all other modifications, variations, or changes that may be made to the appending claims.

What is claimed is:
1. A video decoding method comprising:
generating a prediction block by performing intra prediction for a current block;
deriving transform coefficients of the current block by entropy-decoding a bitstream;
reconstructing a residual block by performing inverse-transformation on the derived transform coefficients; and
reconstructing the current block based on the reconstructed residual block and the prediction block,
wherein the generating the prediction block comprising
obtaining a first prediction value of a prediction target pixel of the prediction block;
determining an initial correction value of the prediction target pixel;
calculating a final correction value of the prediction target pixel by performing an arithmetic right shift on the initial correction value by a binary digit of n, n being an integer equal to or greater than 1; and
generating a final prediction value of the prediction target pixel based on the first prediction value and the final correction value.
2. The video decoding method of claim 1, wherein whether to correct the first prediction value is determined depending on encoding information on the current block and a position of the prediction target pixel in the prediction block and the final prediction value of the prediction target pixel is generated based on a result of the determination.
3. The video decoding method of claim 2, wherein the encoding information comprises at least one of an intra prediction mode, luma signal information, chroma signal information and a block size of the current block.
4. The video decoding method of claim 2, wherein a pixel on a left boundary of the current block is corrected when an intra prediction mode of the current block is a vertical prediction mode.

5. A video encoding method comprising:
generating a prediction block by performing intra prediction for a current block;
obtaining a residual block based on the prediction block and the current block;
deriving transform coefficients of the current block by performing transformation on the obtained residual block; and
entropy-encoding the derived transform coefficients into a bitstream,
wherein the generating the prediction block comprising
   obtaining a first prediction value of a prediction target pixel of the prediction block;
   determining an initial correction value of the prediction target pixel;
   calculating a final correction value of the prediction target pixel by performing an arithmetic right shift on the initial correction value by a binary digit of n, n being an integer equal to or greater than 1; and
   generating a final prediction value of the prediction target pixel based on the first prediction value and the final correction value.

6. The video encoding method of claim 5, wherein whether to correct the first prediction value is determined depending on encoding information on the current block and a position of the prediction target pixel in the prediction block and the final prediction value of the prediction target pixel is generated based on a result of the determination.

7. The video encoding method of claim 6, wherein the encoding information comprises at least one of an intra prediction mode, luma signal information, chroma signal information and a block size of the current block.

8. The video encoding method of claim 6, wherein a pixel on a left boundary of the current block is corrected when an intra prediction mode of the current block is a vertical prediction mode.

9. A method for transmitting a bitstream performed by a video encoding apparatus, wherein the method comprising:
generating a prediction block by performing intra prediction for a current block;
obtaining a residual block based on the prediction block and the current block;
deriving transform coefficients of the current block by performing transformation on the obtained residual block;
entropy-encoding the derived transform coefficients into a bitstream; and
transmitting the bitstream to a video decoding apparatus,
wherein the generating the prediction block comprising
   obtaining a first prediction value of a prediction target pixel of the prediction block;
   determining an initial correction value of the prediction target pixel;
   calculating a final correction value of the prediction target pixel by performing an arithmetic right shift on the initial correction value by a binary digit of n, n being an integer equal to or greater than 1; and
   generating a final prediction value of the prediction target pixel based on the first prediction value and the final correction value.

10. The method of claim 9, wherein the bitstream comprises encoding information on the current block,
wherein whether to correct the first prediction value is determined depending on the encoding information on the current block and a position of the prediction target pixel in the prediction block and
wherein the final prediction value of the prediction target pixel is generated based on a result of the determination.

11. The method of claim 10, wherein the encoding information comprises at least one of an intra prediction mode, luma signal information, chroma signal information and a block size of the current block.

12. The method of claim 10, wherein a pixel on a left boundary of the current block is corrected when an intra prediction mode of the current block is a vertical prediction mode.

* * * * *

UNITED STATES PATENT AND TRADEMARK OFFICE
CERTIFICATE OF CORRECTION

PATENT NO. : 11,706,438 B2
APPLICATION NO. : 17/544709
DATED : July 18, 2023
INVENTOR(S) : Hui Yong Kim et al.

Page 1 of 1

It is certified that error appears in the above-identified patent and that said Letters Patent is hereby corrected as shown below:

On the Title Page

Page 3, Item (56) Column 1
Line 5: Delete "Vertifcal" and insert --Vertical--

In the Claims

Column 22
Claim 1: Line 42: After "comprising", insert --:--

Column 23
Claim 5: Line 11: After "comprising", insert --:--

Column 24
Claim 9: Line 9: After "comprising", insert --:--

Column 24
Claim 10: Line 27: After "block", insert --,--

Signed and Sealed this
Sixth Day of February, 2024

Katherine Kelly Vidal
*Director of the United States Patent and Trademark Office*